(12) United States Patent
Davis et al.

(10) Patent No.: US 10,948,449 B2
(45) Date of Patent: Mar. 16, 2021

(54) SENSOR WITH MULTIPLE INLETS

(71) Applicant: MSA TECHNOLOGY, LLC, Cranberry Township, PA (US)

(72) Inventors: Brian Keith Davis, Butler, PA (US); Michael Alvin Brown, Cranberry Township, PA (US); Mark Flori Zanella, Sr., Chicora, PA (US)

(73) Assignee: MSA Technology, LLC, Cranberry Township, PA (US)

( * ) Notice: Subject to any disclaimer, the term of this patent is extended or adjusted under 35 U.S.C. 154(b) by 105 days.

(21) Appl. No.: 15/685,432

(22) Filed: Aug. 24, 2017

(65) Prior Publication Data

US 2018/0080894 A1 Mar. 22, 2018

Related U.S. Application Data

(60) Provisional application No. 62/395,499, filed on Sep. 16, 2016.

(51) Int. Cl.
*G01N 27/327* (2006.01)
*G01N 27/404* (2006.01)
*G01N 27/407* (2006.01)

(52) U.S. Cl.
CPC ..... *G01N 27/3271* (2013.01); *G01N 27/3274* (2013.01); *G01N 27/4045* (2013.01); *G01N 27/4078* (2013.01)

(58) Field of Classification Search
CPC ........... G01N 27/3271; G01N 27/4045; G01N 27/3274; G01N 27/4078
USPC ........................................ 73/31.05
See application file for complete search history.

(56) References Cited

U.S. PATENT DOCUMENTS

| 5,314,605 A | 5/1994 | Matthiessen |
| 7,147,761 B2 * | 12/2006 | Davis ................. G01N 27/4045 204/421 |
| 8,702,935 B2 | 4/2014 | Davis |
| 2003/0159930 A1 * | 8/2003 | Kiesele .............. G01N 27/4045 204/415 |
| 2006/0249382 A1 | 11/2006 | Hengstenberg |
| 2009/0301876 A1 * | 12/2009 | Wagner ................. G01N 27/30 204/415 |
| 2011/0100813 A1 * | 5/2011 | Davis ..................... G01N 27/40 204/415 |

(Continued)

FOREIGN PATENT DOCUMENTS

| CN | 201477070 U * | 5/2010 |
| WO | WO2018052743 A1 | 3/2018 |

OTHER PUBLICATIONS

UME 100 Passive Sampler for Formaldehyde; http://www.skcinc.com/catalog/product_info.php?products_id=872.

(Continued)

*Primary Examiner* — Marrit Eyassu
(74) *Attorney, Agent, or Firm* — Bartony & Associates LLC

(57) ABSTRACT

An electrochemical gas sensor includes a sensor housing having a plurality of inlet passages, wherein each of the plurality of inlet passages has a cross-sectional area of no greater than 11,309 μm². The electrochemical gas sensor further includes a working electrode within the housing which is responsive to an analyte gas and an electrolyte within the sensor housing in ionic contact with the working electrode.

23 Claims, 19 Drawing Sheets

(56) References Cited

U.S. PATENT DOCUMENTS

| | | | | |
|---|---|---|---|---|
| 2011/0100814 A1* | 5/2011 | Brown | ............... | G01N 27/404 204/415 |
| 2014/0202856 A1* | 7/2014 | Roxhed | ............. | G01N 27/4045 204/412 |
| 2014/0311905 A1* | 10/2014 | Stetter | ..................... | B01J 31/06 204/424 |
| 2015/0247818 A1* | 9/2015 | Silvester | ........... | G01N 27/4045 205/793 |
| 2016/0178565 A1 | 6/2016 | Chapples | | |

OTHER PUBLICATIONS

Gustafson, Pernilla et al., Formaldehyde Levels in Sweden: personal exposure, indoor, and outdoor concentrations, Journal of Exposure Analysis and Environmental Epidemiology (2005), 15, 252-260.

Lindahl, Roger et al., Laboratory validation of a Diffusive Sampler for the Determination of Glutaraldehyde in Air; A Journal of Chromatography ,710 (1995), 175-180.

* cited by examiner

SENSOR WITH MULTIPLE INLETS

CROSS-REFERENCE TO RELATED APPLICATIONS

This application claims benefit of U.S. Provisional Patent Application Ser. No. 62/395,499, filed Sep. 16, 2016, the disclosure of which is incorporated herein by reference.

BACKGROUND

The following information is provided to assist the reader in understanding technologies disclosed below and the environment in which such technologies may typically be used. The terms used herein are not intended to be limited to any particular narrow interpretation unless clearly stated otherwise in this document. References set forth herein may facilitate understanding of the technologies or the background thereof. The disclosure of all references cited herein are incorporated by reference.

The performance of electrochemical sensors (including sensitivity and response times) fluctuate with changes in environmental conditions such as temperature and relative humidity. Frequent calibrations of electrochemical sensors are recommended as a result of such fluctuations. Further, the effects are somewhat predictable, and compensation to sensor output can be made using various techniques. However, it is desirable to reduce the magnitude and speed of fluctuations resulting from changes in, for example, environmental conditions to reduce the requirement for frequent calibration and to provide even more accurate corrections for sensor response.

SUMMARY

In one aspect, an electrochemical gas sensor includes a sensor housing having a plurality of inlet passages, wherein each of the plurality of inlet passages has a cross-sectional or geometric area of no greater than 11,309 $\mu m^2$ (for example, corresponding to an inlet passage having an average diameter of no greater than 120 $\mu m$). The electrochemical gas sensor further includes a working electrode within the housing which is responsive to an anlayte gas and an electrolyte within the sensor housing in ionic contact with the working electrode. In a number of embodiments, each of the plurality of inlet passages has a cross-sectional or geometric area of no more than 2827 $\mu m^2$ (for example, corresponding to an inlet passage having an average diameter of no greater than 60 $\mu m$) or a cross-sectional area of no more than 1257 $\mu m^2$ (for example, corresponding to an inlet passage having an average diameter of no greater than 40 $\mu m$).

In a number of embodiments, a cumulative geometric area of the plurality of inlet passages (that is, the cumulative total of the cross-sectional or geometric areas of each of the plurality of inlet passages) is in the range of 0.25 $mm^2$ to 2.25 $mm^2$. The sensor may, for example, be adapted to detect concentration changes of the analyte gas on the order of 5000 ppm or less, on the order of 1000 ppm or less or on the order of 100 ppm or less.

In a number of embodiments, the sensor is adapted to detect changes in concentration of an analyte gas other than oxygen. The electrolyte may, for example, be a hygroscopic electrolyte (for example, an aqueous electrolyte). In a number of embodiments, the electrolyte includes an aqueous acidic solution. As used herein, the term hygroscopic refers to materials that tend to absorb moisture from the surrounding environment.

In another aspect, a method of detecting an analyte gas includes providing an electrochemical gas sensor, including a sensor housing having a plurality of inlet passages, each of the plurality of inlet passages having a cross-sectional or geometric area of no greater than 11,309 $\mu m^2$ (for example, corresponding to an inlet passage having an average diameter of no greater than 120 $\mu m$), a working electrode within the housing which is responsive to the anlayte gas, and an electrolyte within the sensor housing in ionic contact with the working electrode; and measuring the response of the sensor. In a number of embodiments, the electrochemical gas sensor may, for example, further have the attributes described above.

In a further aspect, a method of fabricating an electrochemical gas sensor includes providing a sensor housing having a plurality of inlet passages, each of the plurality of inlet passages having a cross-sectional or geometric area of no greater than 11,309 $\mu m^2$ (for example, corresponding to an inlet passage having an average diameter of no greater than 120 $\mu m$), providing a working electrode within the housing which is responsive to the anlayte gas; and providing an electrolyte within the sensor housing in ionic contact with the working electrode. In a number of embodiments, the electrochemical gas sensor may, for example, further have the attributes described above.

In a further aspect, a method of reducing or limiting the effect of environmental changes such as humidity changes within a housing into which a gas must enter, includes forming a plurality of inlet passages through the housing, wherein each of the plurality of inlet passages has a cross-sectional or geometric area of no greater than 11,309 $\mu m^2$ (for example, corresponding to an inlet passage having an average diameter of no greater than 120 $\mu m$). The housing may, for example, include a hygroscopic material therein or otherwise include one or more substances, devices or systems that are sensitive to changes in vapors, moisture and/or humidity.

In still a further aspect, a housing structure for an electrochemical gas sensor includes a plurality of inlet passages, wherein each of the plurality of inlet passages has a cross-sectional or geometric area of no greater than 11,309 $\mu m^2$ (for example, corresponding to an inlet passage having an average diameter of no greater than 120 $\mu m$). In a number of embodiments, the housing structure may, for example, further have the attributes described above.

The devices, systems and methods hereof provide similar or improved sensitivities as those provided with conventional electrochemical sensors (which typically include a single or several relatively large diameter inlet passages). Moreover, the devices, systems and methods hereof may reduce the effects of changes in humidity within the interior of a system such as a sensor system.

The present devices, systems, and methods, along with the attributes and attendant advantages thereof, will best be appreciated and understood in view of the following detailed description taken in conjunction with the accompanying drawings.

DETAILED DESCRIPTION

Figure 1:
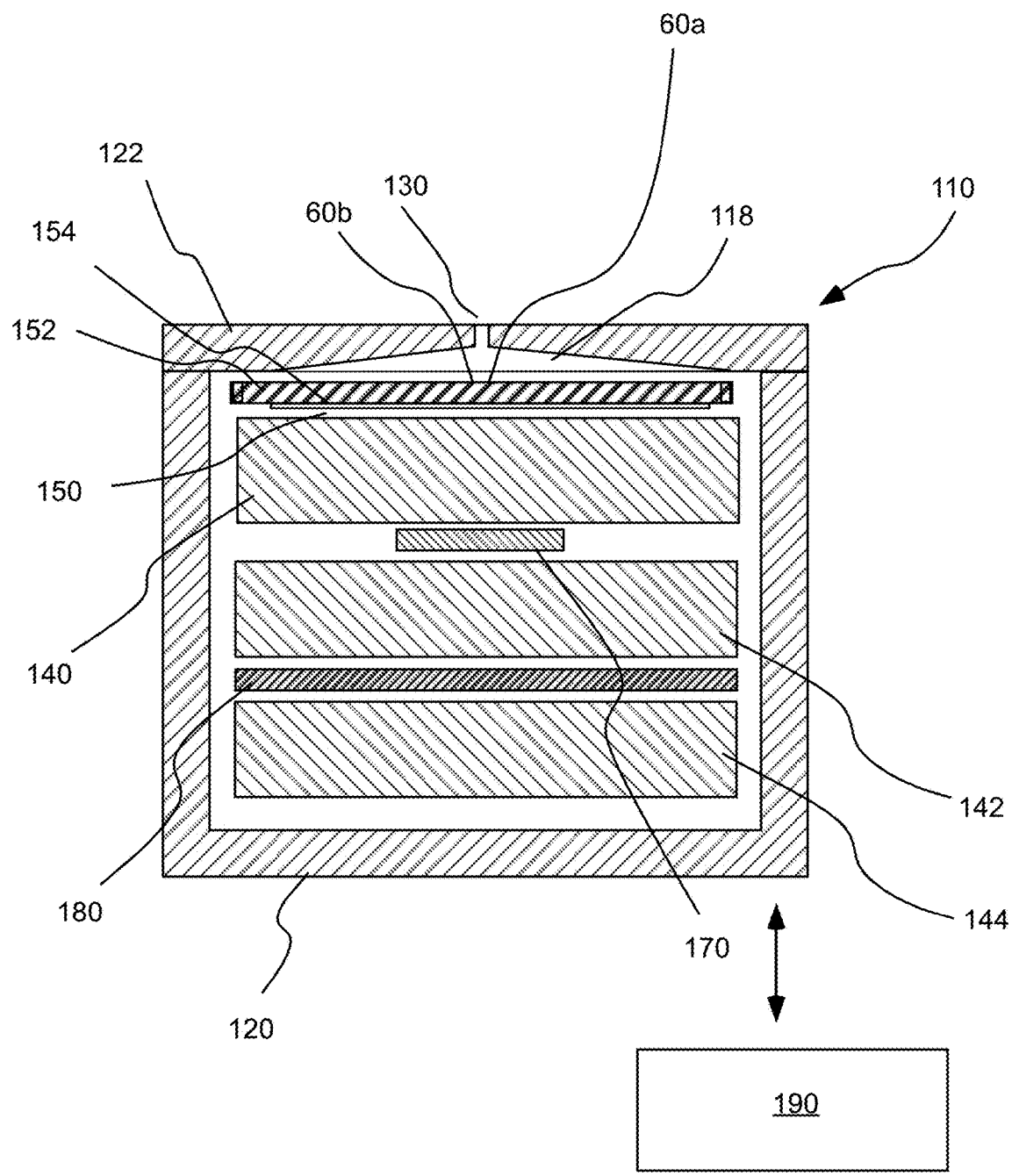
FIG. 1 illustrates a cross-sectional view of a conventional, single-inlet electrochemical gas sensor.

It will be readily understood that the components of the embodiments, as generally described and illustrated in the figures herein, may be arranged and designed in a wide variety of different configurations in addition to the described representative embodiments. Thus, the following more detailed description of the representative embodiments, as illustrated in the figures, is not intended to limit the scope of the embodiments, as claimed, but is merely illustrative of representative embodiments.

Reference throughout this specification to "one embodiment" or "an embodiment" (or the like) means that a particular feature, structure, or characteristic described in connection with the embodiment is included in at least one embodiment. Thus, the appearance of the phrases "in one embodiment" or "in an embodiment" or the like in various places throughout this specification are not necessarily all referring to the same embodiment.

Furthermore, described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, et cetera. In other instances, well known structures, materials, or operations are not shown or described in detail to avoid obfuscation.

As used herein and in the appended claims, the singular forms "a," "an", and "the" include plural references unless the context clearly dictates otherwise. Thus, for example, reference to "an electrode" includes a plurality of such electrodes and equivalents thereof known to those skilled in the art, and so forth, and reference to "the electrode" is a reference to one or more such electrodes and equivalents thereof known to those skilled in the art, and so forth. Recitation of ranges of values herein are merely intended to serve as a shorthand method of referring individually to each separate value falling within the range. Unless otherwise indicated herein, and each separate value, as well as intermediate ranges, are incorporated into the specification as if individually recited herein. All methods described herein can be performed in any suitable order unless otherwise indicated herein or otherwise clearly contraindicated by the text.

The terms "electronic circuitry", "circuitry" or "circuit," as used herein includes, but is not limited to, hardware, firmware, software or combinations of each to perform a function(s) or an action(s). For example, based on a desired feature or need. a circuit may include a software controlled microprocessor, discrete logic such as an application specific integrated circuit (ASIC), or other programmed logic device. A circuit may also be fully embodied as software. As used herein, "circuit" is considered synonymous with "logic." The term "logic", as used herein includes, but is not limited to, hardware, firmware, software or combinations of each to perform a function(s) or an action(s), or to cause a function or action from another component. For example, based on a desired application or need, logic may include a software controlled microprocessor, discrete logic such as an application specific integrated circuit (ASIC), or other programmed logic device. Logic may also be fully embodied as software.

The term "processor," as used herein includes, but is not limited to, one or more of virtually any number of processor systems or stand-alone processors, such as microprocessors, microcontrollers, central processing units (CPUs), and digital signal processors (DSPs), in any combination. The processor may be associated with various other circuits that support operation of the processor, such as random access memory (RAM), read-only memory (ROM), programmable read-only memory (PROM), erasable programmable read only memory (EPROM), clocks, decoders, memory controllers, or interrupt controllers, etc. These support circuits may be internal or external to the processor or its associated electronic packaging. The support circuits are in operative communication with the processor. The support circuits are not necessarily shown separate from the processor in block diagrams or other drawings.

The term "software," as used herein includes, but is not limited to, one or more computer readable or executable instructions that cause a computer or other electronic device to perform functions, actions, or behave in a desired manner. The instructions may be embodied in various forms such as routines, algorithms, modules or programs including separate applications or code from dynamically linked libraries. Software may also be implemented in various forms such as a stand-alone program, a function call, a servlet, an applet, instructions stored in a memory, part of an operating system or other type of executable instructions. It will be appreciated by one of ordinary skill in the art that the form of software is dependent on, for example, requirements of a desired application, the environment it runs on, or the desires of a designer/programmer or the like.

Many gas detection devices, instruments or systems (for example, portable gas detection instruments) include amperometric electrochemical gas sensors. These sensors are often referred to as "fuel cell" type sensors, which refers to a primary principle of operation. Such electrochemical gas sensors are typically combined or integrated into a device, system or instrument with a battery or other power supply, appropriate electronic driving circuitry (for example, including a potentiostat), a display, and one or more alarms (or other means of communicating to the user the presence of a dangerous level of harmful or toxic gas or a condition of dangerous oxygen depletion or enrichment). The sensor, circuitry and displays are typically contained in a rugged, sealed housing. As used in connection with such an instrument, the term "sealed" refers to protection of the sensor, circuitry, and displays from harmful environmental hazards (for example, dusts, condensing vapors, such as paints or coatings, and water and/or other liquids). The sealed housing must continually provide for the efficient transfer of the target or analyte gas(es) from outside the instrument housing into a housing of the sensor itself. Often, this result is accomplished with one or more porous diffusion membranes that keep dusts, vapors, and liquids out of the instrument housing, but allow one or more analyte gases of interest to be transported into the sensor itself. This transport is typically accomplished by gaseous diffusion or by pumping an analyte gas stream into or across the face of the sensor.

Amperometric or fuel cell-type gas sensors typically include at least two electrocatalytic electrodes (an anode and a cathode), at least one of which is a gas diffusion electrode or working electrode. The working electrode can be either the anode or the cathode in any given sensor. The gas diffusion electrode typically includes fine particles of an electrocatalytic material adhered to one side of a porous or gas-permeable membrane.

The electrocatalytic side of the working electrode is in ionic contact with the second electrode (the counter electrode, whether the anode or the cathode) via an electrolyte (for example, a liquid electrolyte, a solid electrolyte, a quasi-solid state electrolyte or an ionic liquid). A liquid electrolyte is typically a solution of a strong electrolyte salt dissolved in a suitable solvent, such as water. An organic solvent may also be used. Quasi-solid state electrolytes can, for example, include a liquid electrolyte immobilized by a high-surface-area, high-pore-volume solid. The working electrode and the counter electrode are also in electrical contact via an external circuit used to measure the current that flows through the sensor.

Additionally, although by no means necessary, a third or reference electrode, is often included. The reference electrode is constructed in a way that its potential is relatively invariant over commonly occurring environmental conditions. The reference electrode serves as a fixed point in potential space against which the operating potential of the working electrode may be fixed. In this way, electrochemical reactions that would not normally be accessible may be used to detect the analyte gas of interest. This result may be accomplished via control and driving circuitry which may, for example, include a potentiostat.

An electrochemical sensor's sensitivity is influenced by the water content of its electrolyte. Electrolytes in electrochemical sensors are typically hygroscopic. Water vapor transpires back and forth across the sensor's interface as the electrolyte adjusts to restore the equilibrium between the electrolyte concentration and the ambient environmental conditions. Over time, the sensor's electrolyte concentration changes as the average humidity changes, leading to fluctuations in the sensor's sensitivity. Generally, as the sensor's interior becomes drier, its sensitivity decreases. And conversely, as the sensor's interior becomes wetter, its sensitivity increases. In more practical terms, lower sensitivities are observed during dryer seasons and higher sensitivities during wetter seasons. To compensate for these sensitivity changes, the sensor typically must be calibrated frequently with target gas. However, these frequent calibrations lead to a higher cost of ownership for the sensor. If the sensor's sensitivity can be designed to be more stable over the course of the annual environmental seasons, the time between calibrations can be extended and the cost of ownership can be decreased.

If the fluctuations in the electrolyte's water content can be reduced, the sensitivity fluctuations of the sensor will be made less dramatic. It is postulated herein that the rate of water transpiration into and out of the sensor will be governed by the geometric area of its inlet passage. A larger passage allows the water to move more rapidly across the sensor interface while a smaller passage leads to lower transpiration rates. Thus, designing a sensor with a smaller inlet passage should reduce the water transpiration. However, this will also reduce the sensor signal as a result of the target gas entering the sensor. The size of the inlet passage has a direct relationship to the sensor sensitivity. This relationship is described in the equation:

$$i_{lim} = nFDAC/d$$

Where $i_{lim}$ is the limiting current, n is the number of electrons involved in the reaction, F is the Faraday constant, D is the diffusion coefficient, C is the concentration of the target gas, d is the diffusion path length and A is the effective area of the electrode. The effective area is defined as the portion of the electrode that is actively involved in the electrochemical reaction. For inlet passage sizes ≥1 mm in diameter, this area is essentially equal to the inlet passage diameter. As gas diffuses through the inlet into the sensor, the majority of the gas travels perpendicular into the electrode, essentially defining the active electrode area. While some diffusion can occur in a radial direction at the edges of the inlet passage, this magnitude of this movement is very small compared to the perpendicular movement at the inlet passage's interior. However, as the inlet passage's diameter gets smaller, namely <0.5 mm, the contribution of this radial movement of the gas becomes more significant. The electrode active area is now defined by not only the inlet passage's diameter but also the radial movement at the inlet passage's edges, leading to larger active areas. However, reducing the diameter of a single inlet passage into a region where the radial contribution to the signal becomes appreciable also leads to much lower overall signal that may be unusable. In a number of embodiments hereof, this disadvantage is overcome by replacing a large single inlet passage or hole (or several large passages or holes) with many smaller inlet passages or holes. Without limitation to any mechanism, a usable signal may still be maintained, but with a much smaller total inlet passage geometric area as a result the radial diffusion contributions at each individual inlet passage. Indeed, sensitivity may even be increased using a plurality of small inlet passages hereof, while the total geometric area of such small inlet passage is significantly less than the total geometric area of the inlet passage(s) of a conventional sensor. In the sensors hereof, the effective electrode area is increased, while to the total geometric area of the inlet passages is decreased.

FIG. 1 illustrates an example of a currently available or conventional electrochemical sensor 110 including a housing 120 having a gas inlet 130 (formed in a lid 122 of sensor housing 120) for entry of analyte gas into sensor 110. In the illustrated embodiment, inlet 130 is in fluid connection with a gas diffusion volume or space 118. Electrolyte saturated wick materials 140, 142 and 144 separate a working electrode 150 or a plurality of working electrodes (which is/are responsive to the presence of analyte gas) from reference electrode(s) 170 and counter electrode(s) 180 within sensor 110 and provide ionic conduction therebetween via the electrolyte absorbed therein. Electronic circuitry 190 as known in the art is provided, for example, to maintain a desired potential between working electrode 150 and reference electrode(s) 170, to process (via, for example, one or more processors) an output signal from sensor 110 and to connect/communicate with other components of the system (including, for example, one or more displays, communication systems, power supplies etc.).

Working electrode 150 may, for example, be formed by depositing a first layer of catalyst 154 on a diffusion membrane 152 (using, for example, catalyst deposition techniques known in the sensor arts). Methods of fabricating electrodes on diffusion membranes are, for example, described in U.S. Patent Application Publication No. 2011/0100813.

Figure 2:
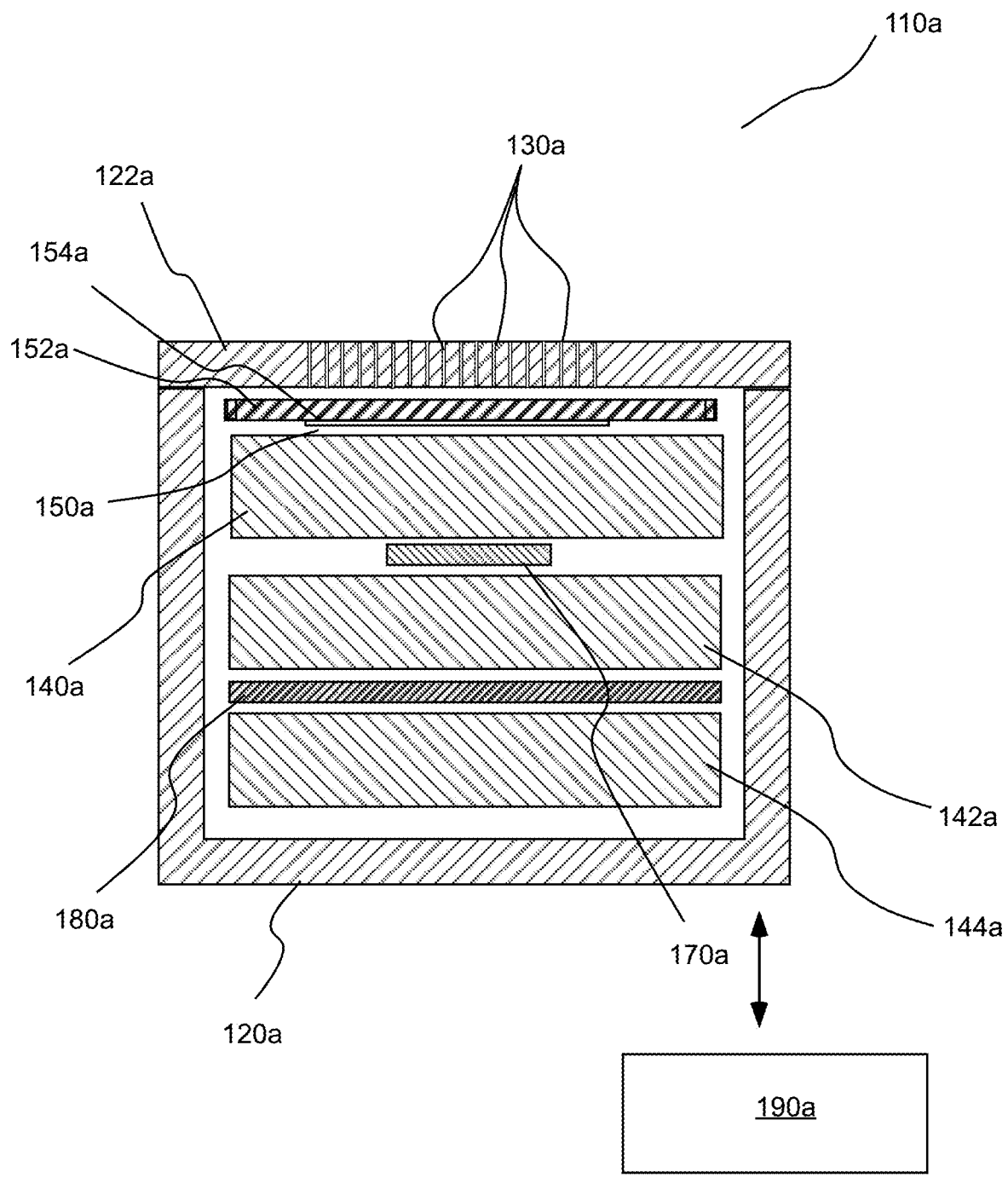
FIG. 2 illustrates a cross-sectional view of an electrochemical gas sensor hereof including a plurality of inlet passages or holes in an upper section or lid thereof.
Figure 3A:
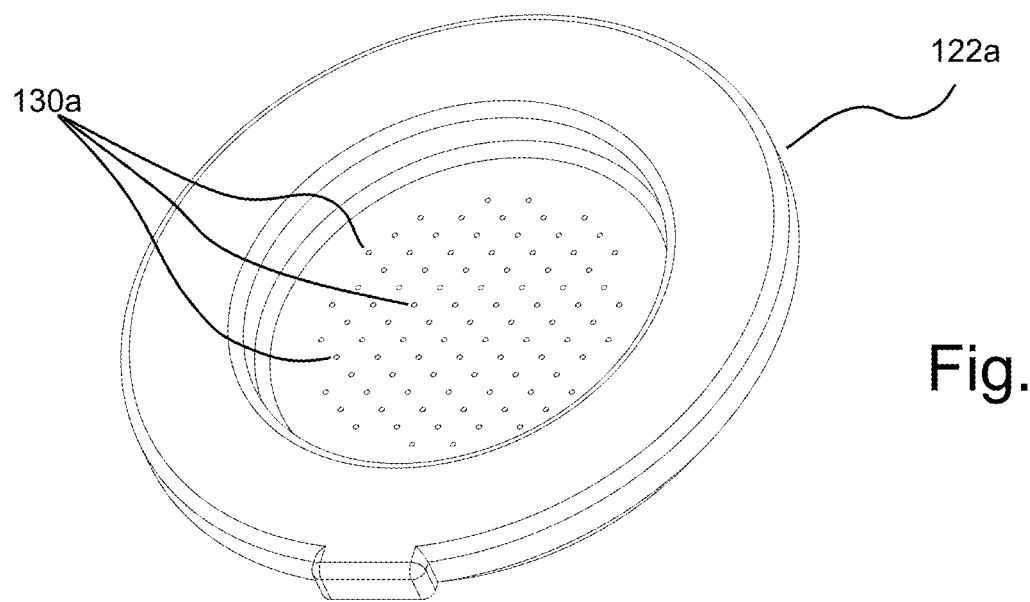
FIG. 3A illustrates a perspective view of the lid of the electrochemical gas sensor of FIG. 2.
Figure 3B:
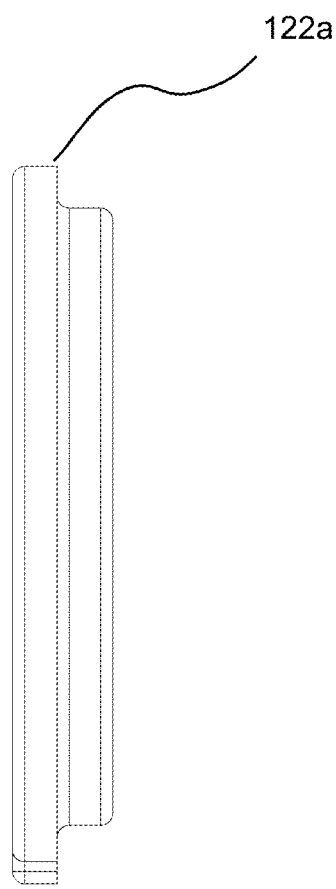
FIG. 3B illustrates a side view of the lid of the electrochemical gas sensor of FIG. 2.
Figure 3C:
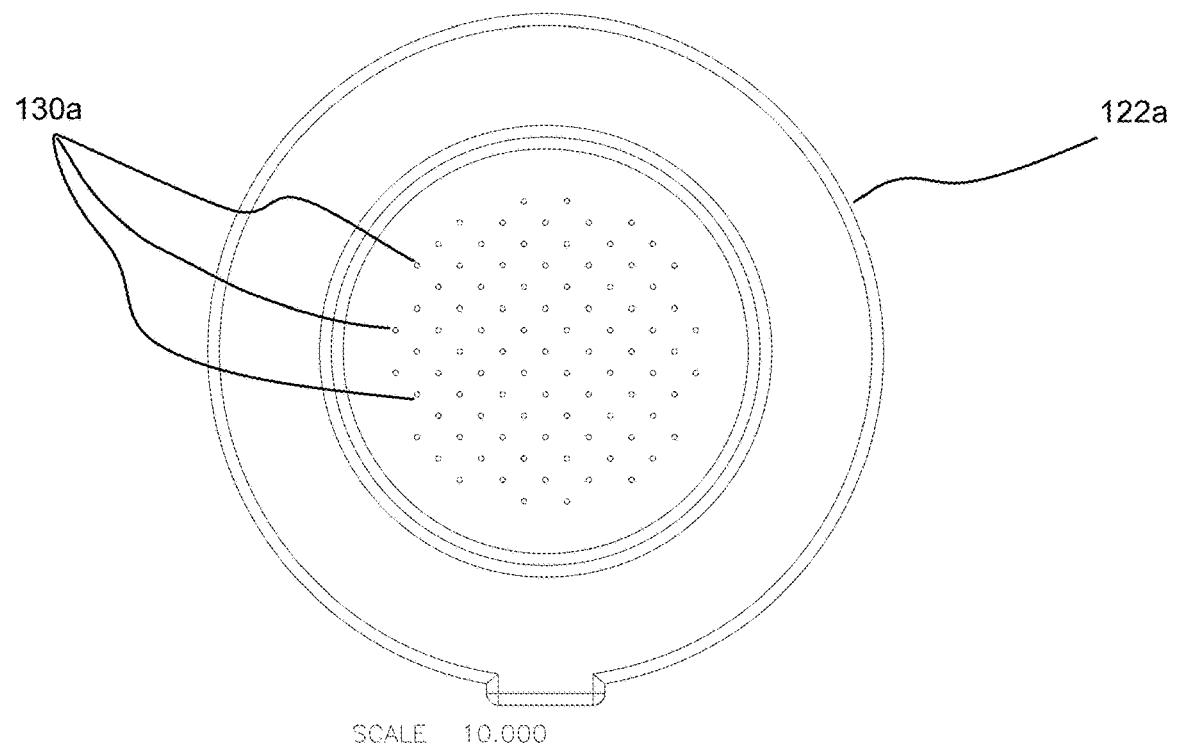
FIG. 3C illustrates a top view of the lid of the electrochemical gas sensor of FIG. 2.
Figure 3D:
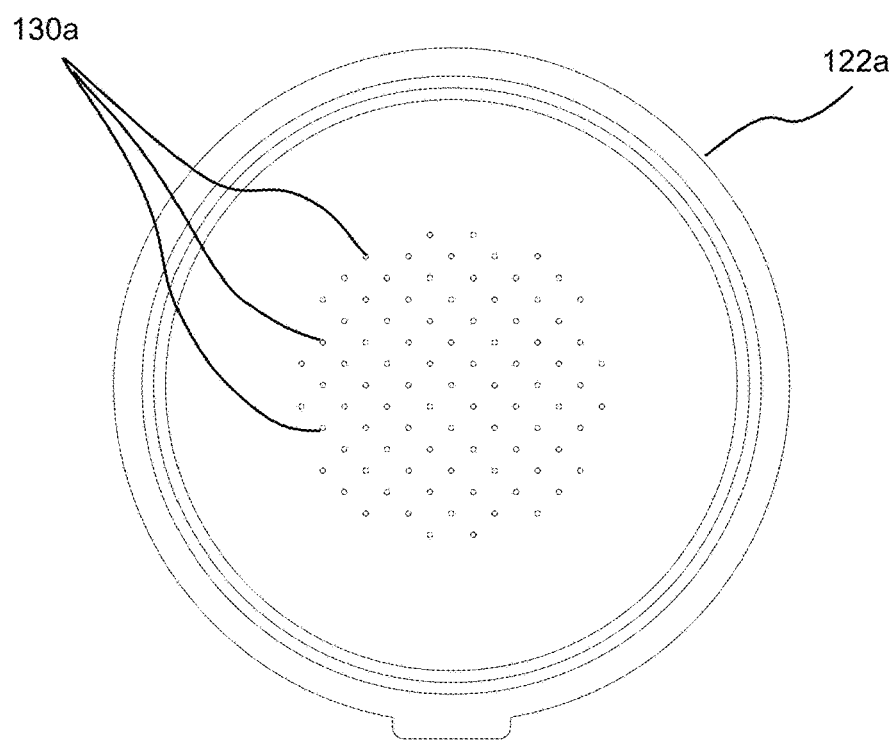
FIG. 3D illustrates a bottom view of the lid of the electrochemical gas sensor of FIG. 2.
Figure 4:
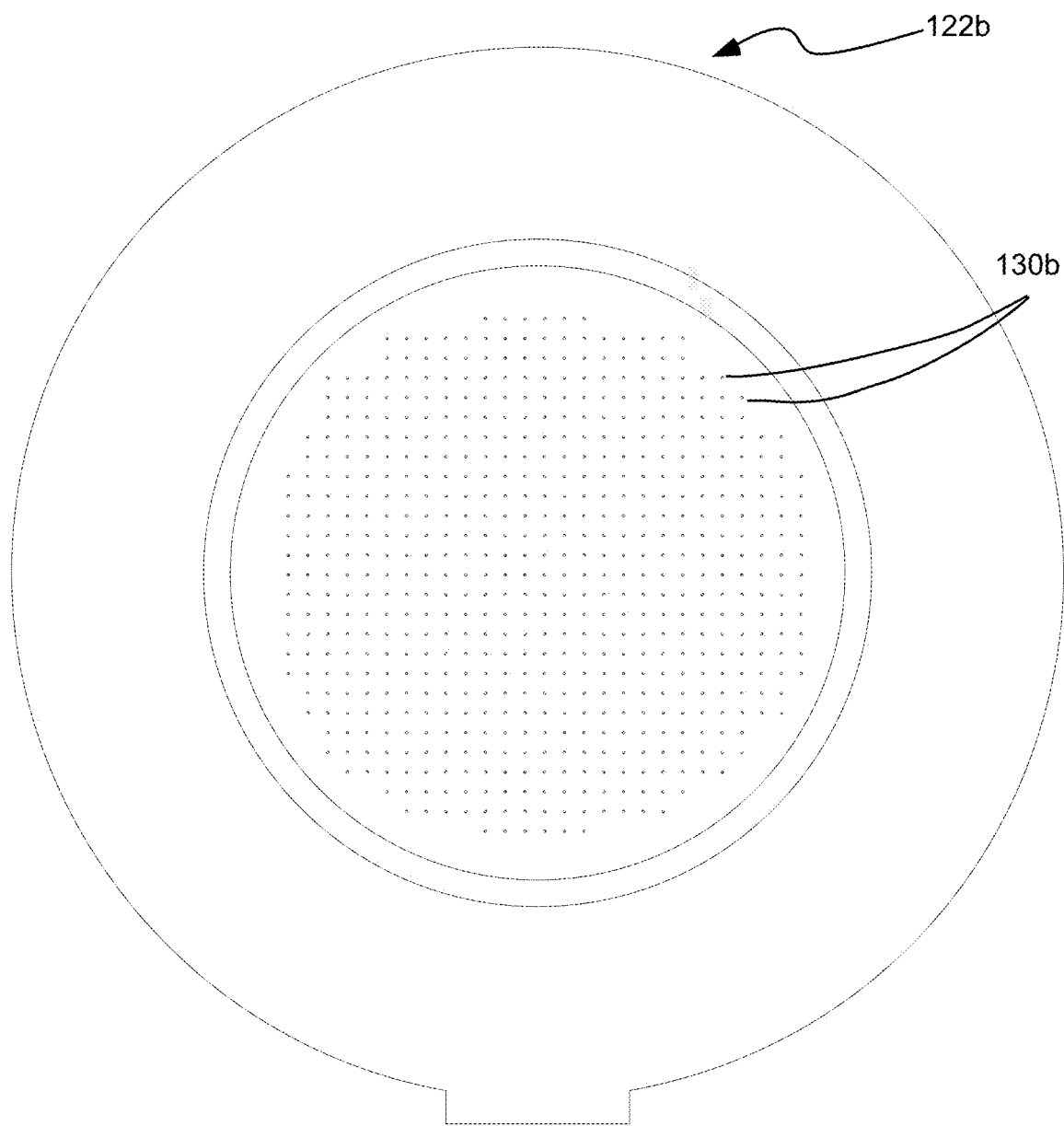
FIG. 4 illustrates a top view of another embodiment of a lid for the electrochemical gas sensor of FIG. 2 including a greater number of holes than the lid of FIG. 3A.

FIG. 2 illustrates a representative embodiment of an electrochemical sensor 110a hereof including a housing 120a having a plurality of gas inlet passages 130a (formed in a lid 122a of sensor housing 120a) for entry of gas into sensor 110a. An embodiment of lid 122a is further illustrated in FIGS. 3A through 3D. FIG. 4 illustrates another embodiment of a lid 122b having a greater number of inlet passages 130b (600 inlets passages 130b, each having a diameter of 0.036 mm or 36 µm, in the illustrated embodiment). In other respects, electrochemical gas sensor 110a is similar in construction and operation to sensor 110. Components of sensor 110a are numbered similarly to corresponding components of sensor 110 with the addition of the designation "a". Similar to sensor 110, electrolyte saturated wick materials 140a, 142a and 144a separate working electrode or electrodes 150a from reference electrode(s) 170a and counter electrode(s) 180a within sensor 110a and provide ionic conduction therebetween via the electrolyte absorbed therein. Electronic circuitry 190a maintains a desired potential between working electrode 150a and reference electrode(s) 170a. Electronic circuitry 190 may also process an output signal from sensor 110a and connect/communicate with other components of system 100a (including, for example, one or more displays, communication systems, power supplies etc.). As described above, working electrode 150a may, for example, be formed by depositing a first layer of catalyst 154a on a diffusion membrane 152a (using, for example, catalyst deposition techniques known in the sensor arts).

Inlet passages 130a hereof have a very small (average) diameter and/or cross-sectional area compared to a conventional electrochemical gas sensor having a single inlet passage. In a number of embodiments, inlet passages 130a have a diameter of no more than 120 µm (or a cross-sectional area of no more than 11,309 µm$^2$), no more than 60 µm (or a cross-sectional or geometric area of no more than 2827 µm$^2$), no more than 40 µm (or a cross-sectional area of no more than 1257 µm$^2$), 30 µm (or a cross-sectional area of no more than 787 µm$^2$), no more than 20 µm (or a cross-sectional area of no more than 314 µm$^2$), no more than 10 µm (or a cross-sectional area of no more than 79 µm$^2$) or no more than 5 µm (or a cross-sectional area of no more than 20 µm$^2$). It is not necessary that the inlet passages hereof be round.

The sensitivity of a sensor is dependent on the size of the sensor inlet. In general, the larger the inlet passage or hole, the greater the sensitivity. A high sensitivity is desirable as it leads to a higher signal to noise ratio and resolution of the sensor. However, the movement of moisture into and out of the sensor is also dependent on the size of the sensor inlet. A larger inlet yields a more rapid rate of transfer of moisture, resulting in a sensor that responds more rapidly to changes in environmental conditions. In the sensor hereof, a single, relatively large inlet passage or hole is replaced by a plurality smaller inlet passages. In a number of embodiments, the sum of the geometric areas of the small inlet passages hereof is designed to be smaller than the single larger inlet passage of currently available sensors. A typical conventional electrochemical sensor has an inlet diameter of 0.058 inches or 1473 µm (or a cross-sectional area of 1.7×10$^6$ µm$^2$). Movement of moisture in and out of the sensor hereof will be less rapid than currently available electrochemical gas sensors.

Although the inlet passages of the sensors hereof have a significantly smaller cross-sectional area than the conventional single-inlet-passage electrochemical gas sensors designed to sense analyte concentration in the ppb or ppm range, the sensitivity of the sensors hereof can be maintained at a sufficiently high level to provide a suitable signal-to-noise ratio as a result of the nature of the gas diffusion across the working electrode surface. Instead of a single, large-area of electrode that is flooded by target or analyte gas in the case of a conventional electrochemical sensor, the capillary-sized holes of the sensors hereof expose a plurality of very small areas of the working electrode to analyte gas. More of the working electrode catalyst is utilized than in the case of a conventional, large-inlet electrochemical sensor. The efficiency of the electrochemical detection reaction is increased, leading to larger currents and higher sensitivities. Thus, sensors hereof can be produced that have similar or improved sensitivities to those found in conventional, single-inlet sensors, whereas the total geometric area of the plurality of inlet passages in the sensors hereof is significantly less than geometric area of the single inlet of a conventional electrochemical gas sensor.

Figure 5A:
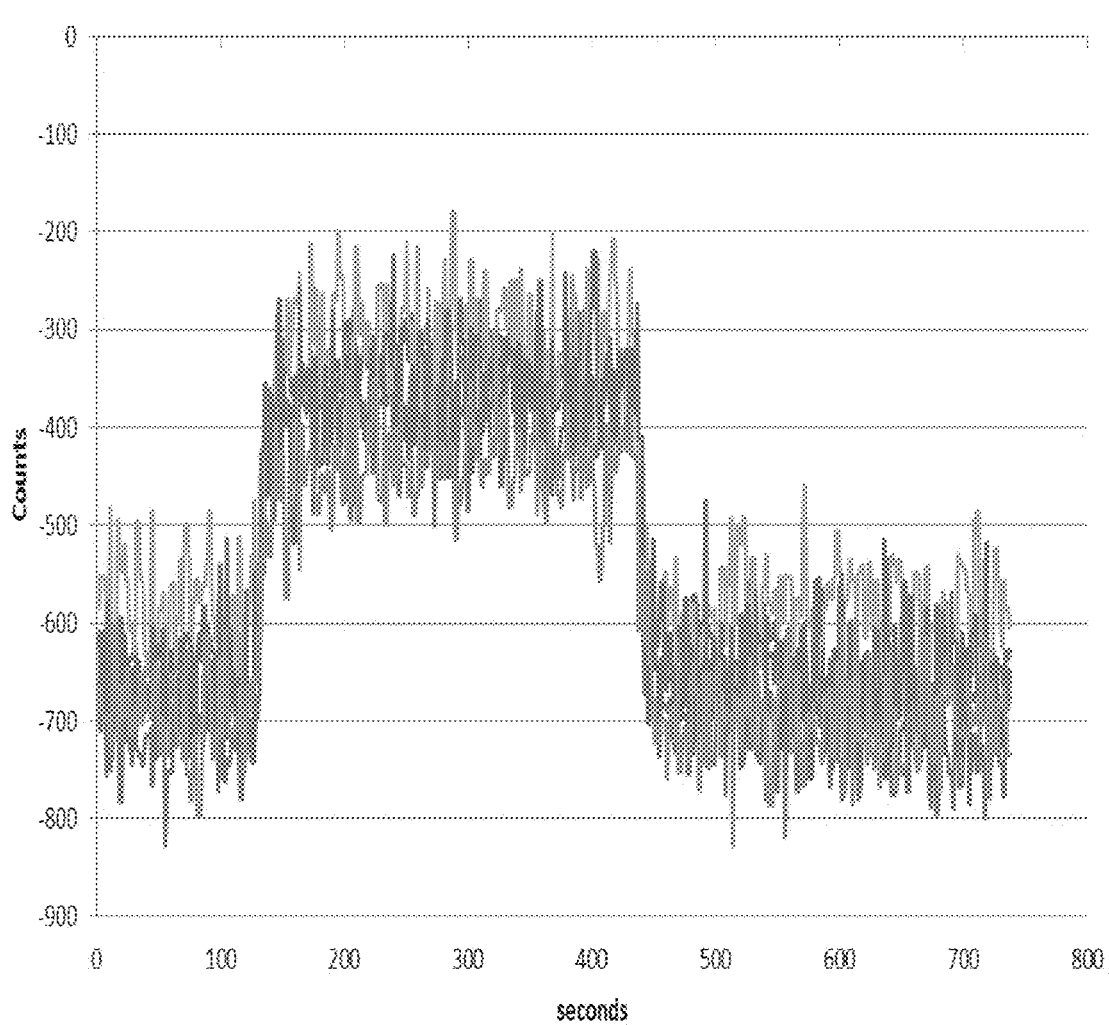
FIG. 5A illustrates responses of sensors (including Pt/Pt/Pt electrodes) including 44 inlet passages or holes of a diameter of 36 µm to 60 ppm of carbon monoxide (CO).
Figure 6:
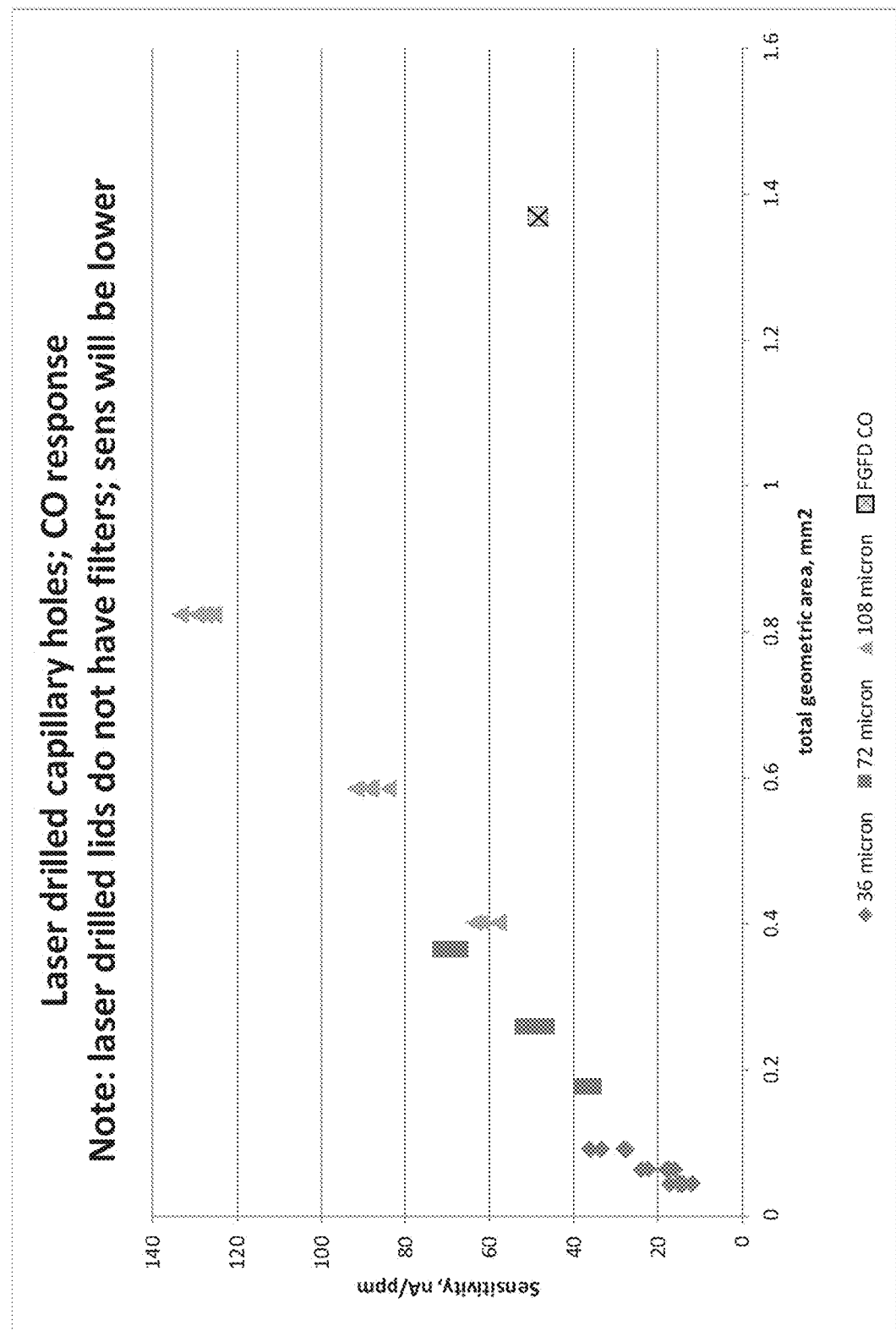
FIG. 6 illustrates a summary of the results in which the sensitivity (nA/ppm) is plotted as a function of total geometric area of the inlet passages in mm$^2$ for CO sensors having 44, 64 and 90 inlet passages or holes and comparison to a conventional, single-inlet CO sensor (the FGFD CO sensor available from Mine Safety Appliances Company of Pittsburgh, Pa.).

In a number of studies of the sensors hereof, sensor lids were fabricated with different combinations of passage/hole size and number of inlet passages/holes. In a number of representative studies with carbon monoxide (CO) and hydrogen sulfide ($H_2S$) sensors, in which all electrodes were platinum electrodes, inlet passage diameters of 36, 72 and 108 microns were studied. The number of laser-drilled inlet passages in the studies was 44, 64 and 90. Laser drilling was used for these studies but any technology that can yield reproducible small inlet passages or capillaries of known diameters could be used (mechanical drilling for example). FIG. 5A illustrates the responses of representative sensors including 44 inlet passages of a diameter of 36 μm to 60 ppm of CO, while FIG. 4C illustrates the response of representative sensors including 90 inlet passages of a diameter of 108 μm to 60 ppm of CO. FIG. 6 illustrates a summary of the results in which the sensitivity (nA/ppm) is plotted as a function of total geometric area of the inlet passages in mm$^2$. As illustrated, the sensitivity increases with increasing geometric area. For comparison, the response of a conventional, single-inlet CO sensor is also provided. The sensors hereof may be readily fabricated to approximate or exceed the sensitivity of a convention single-inlet, CO electrochemical sensor.

Figure 7:
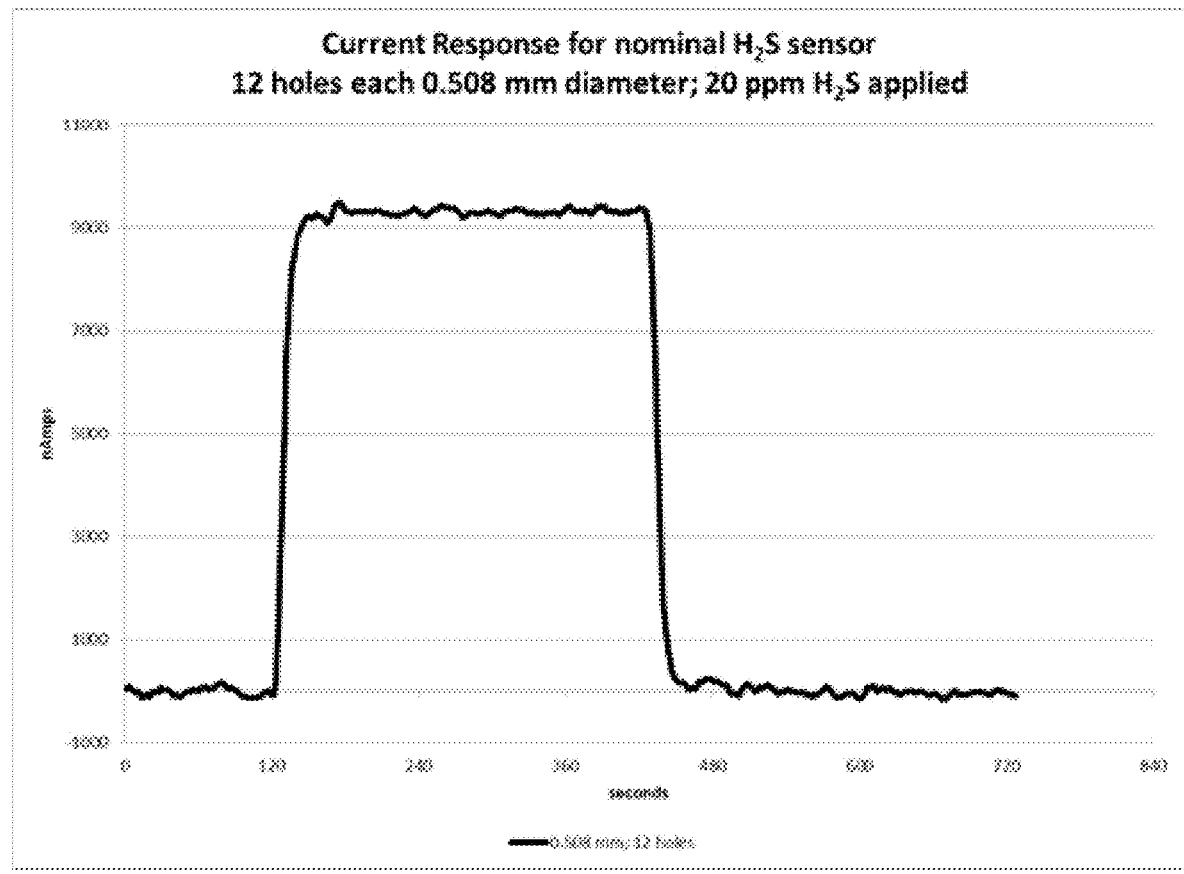
FIG. 7 illustrates output of an $H_2S$ sensor including 12 inlet holes, each having a diameter of approximately 0.508 mm.

FIG. 7 illustrates the output of a sensor formed in the manner of sensor 110a (but with relatively large inlet passages) and including a working electrode designed to detect hydrogen sulfide ($H_2S$). In the studied embodiment, the working electrode was formed by depositing an iridium catalyst on a diffusion membrane, the reference electrode was formed by depositing an iridium catalyst on a diffusion membrane, and the counter electrode was formed by depositing an iridium catalyst on a diffusion membrane. In the studies of FIG. 7, the sensor, which was used as a "typical" or "conventional" large-inlet-diameter sensor for reference or comparison in the studies herein, included 12 inlet holes, each having a diameter of approximately 0.508 mm. The total geometric area for all 12 inlet passages/holes was approximately 2.43 mm$^2$. The experimental procedure in FIG. 7 was to gather a baseline in zero air for 2 minutes, then to apply 20 ppm $H_2S$ for 5 minutes and subsequently to apply zero air again for 5 minutes. A steady state current (the current that is produced while the sensor is at steady state during the application of the 20 ppm $H_2S$) was 9,377 nanoamps. This result yields a sensitivity for the sensor of 469 nanoamps/ppm. In a number of embodiment, sensors hereof including a plurality of small, capillary inlet passages preferably provide a comparable sensitivity.

Figure 8A:
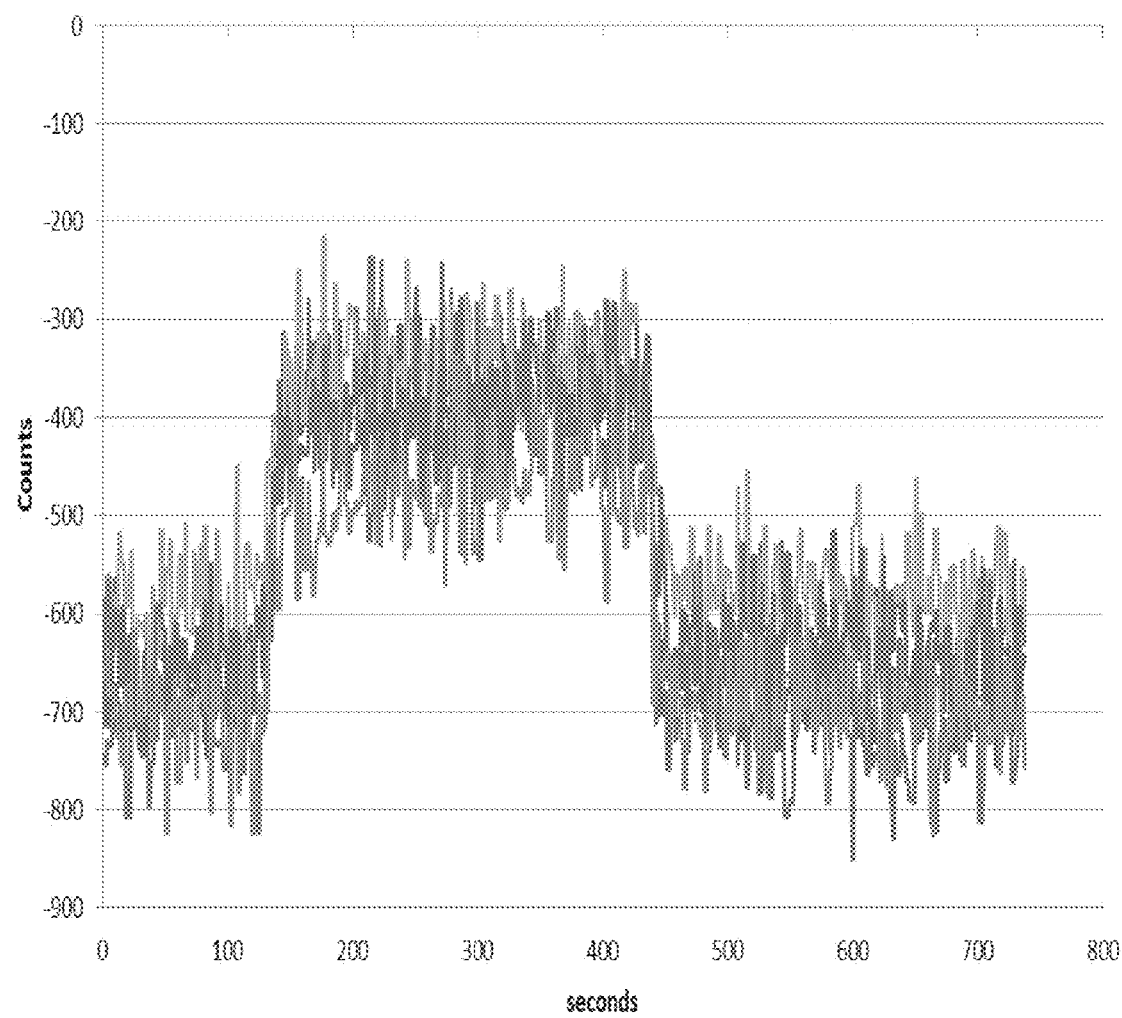
FIG. 8A illustrates responses of (including Pt/Pt/Pt electrodes) sensors including 44 inlet passages or holes of a diameter of 36 µm to 20 ppm of hydrogen sulfide ($H_2S$).
Figure 8B:
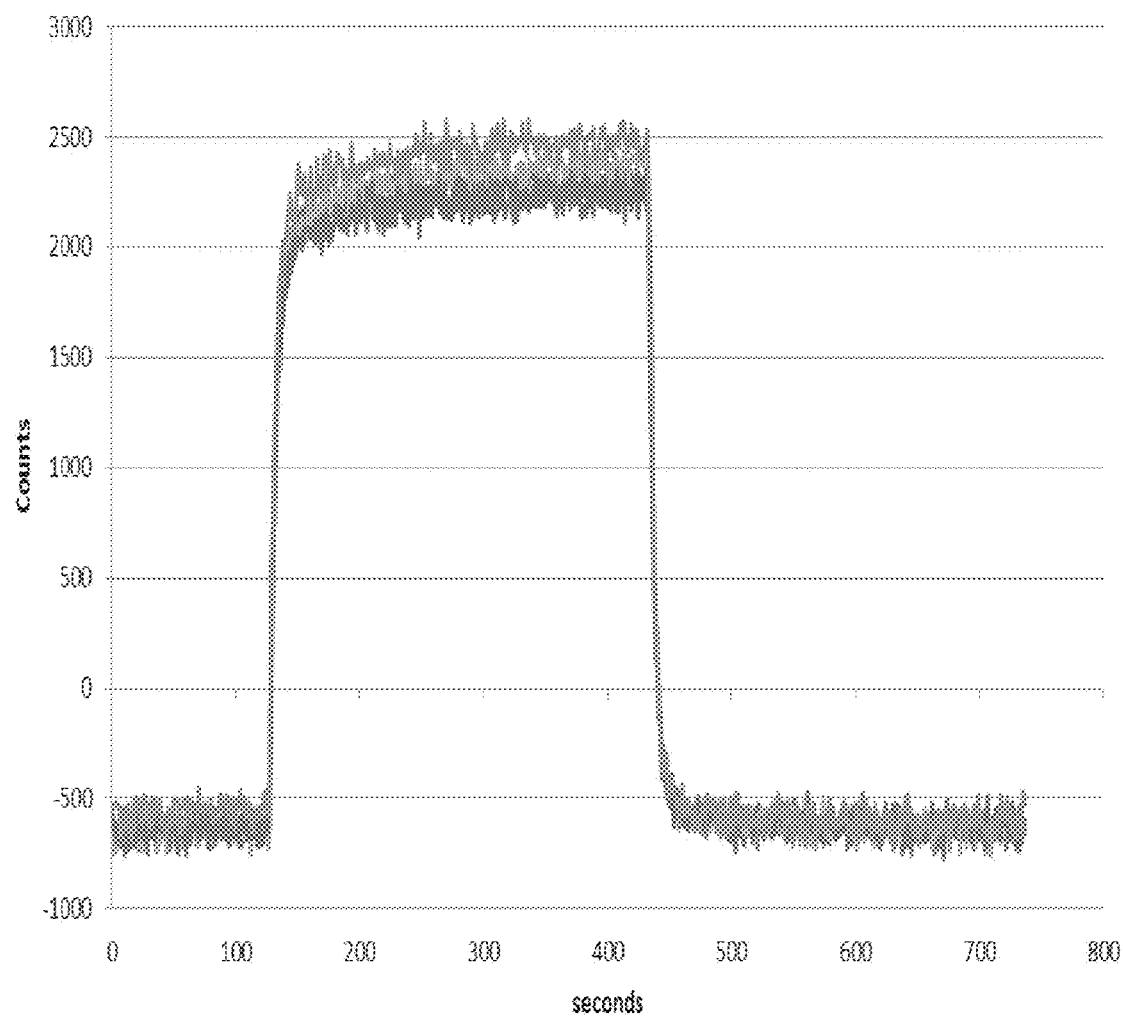
FIG. 8B illustrates responses of sensors including 90 inlet passages or holes of a diameter of 108 µm to 20 ppm of $H_2S$.
Figure 9:
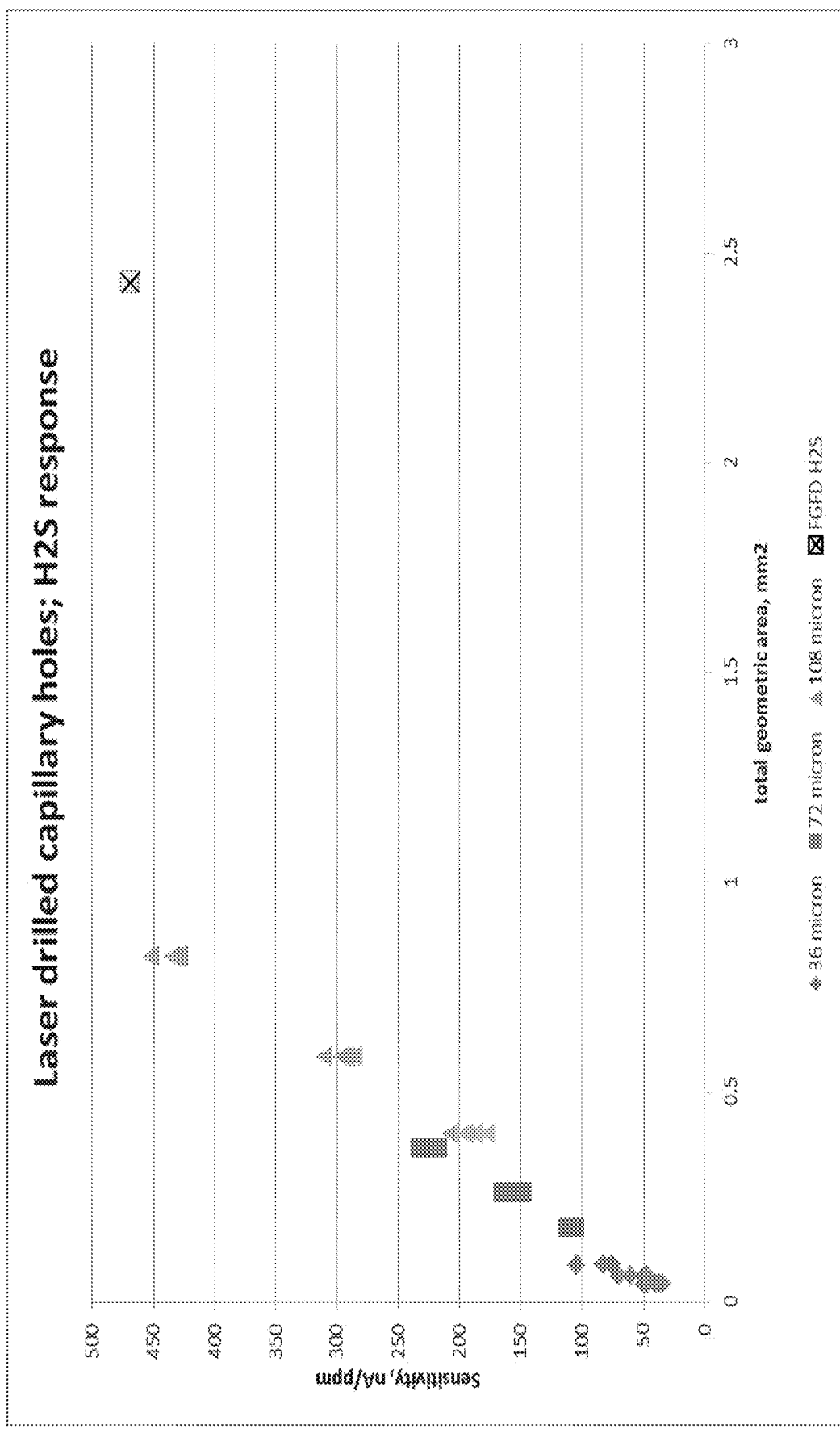
FIG. 9 illustrates a summary of the results in which the sensitivity (nA/ppm) is plotted as a function of total geometric area of the inlet passages in mm$^2$ for $H_2S$ sensors having 44, 64 and 90 inlet passages or holes and comparison to a conventional, single-inlet $H_2S$ sensor (the FGFD $H_2S$ sensor available from Mine Safety Appliances Company).

FIG. 8A illustrates the response of a representative sensor including 44 inlet passages of a diameter of 36 μm to 20 ppm of $H_2S$, while FIG. 8B illustrates the response of a representative sensor including 90 inlet passages of a diameter of 108 μm to 20 ppm of $H_2S$. FIG. 9 illustrates a summary of the results in which the sensitivity (nA/ppm) is plotted as a function of total geometric area of the inlet passages in mm$^2$. As illustrated, the sensitivity increases with increasing geometric area. For comparison, the response of a conventional, single-inlet $H_2S$ sensor is also provided. The sensors hereof may be readily fabricated to approximate or exceed the sensitivity of a convention single-inlet, $H_2S$ electrochemical sensor.

Figure 10:
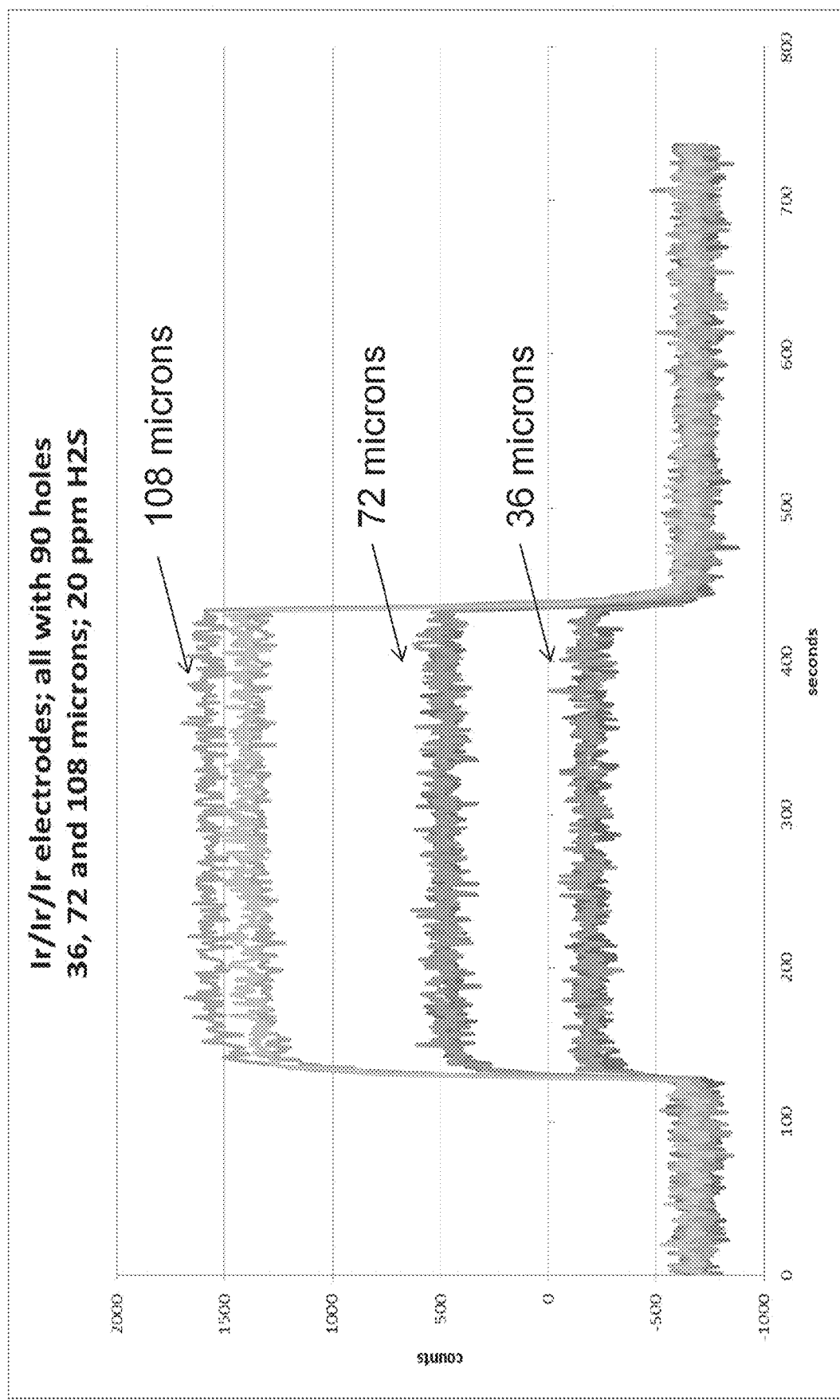
FIG. 10 illustrates responses of sensors (including Ir/Ir/Ir electrodes) including 90 inlet passages or holes of a diameter of 36 µm, 72 µm and 108 µm to 20 ppm of $H_2S$.

Further experiments were conducted with $H_2S$ sensor in which all electrodes included an Ir catalyst (Ir/Ir/Ir electrodes). A total of 9 sensors were studied in which each sensor had 90 inlet passages. The diameters of the inlet passages were 36, 72 or 108 μm for three sensors of each type. Response of the sensors to 20 ppm $H_2S$ is illustrated in FIG. 10.

Figure 11:
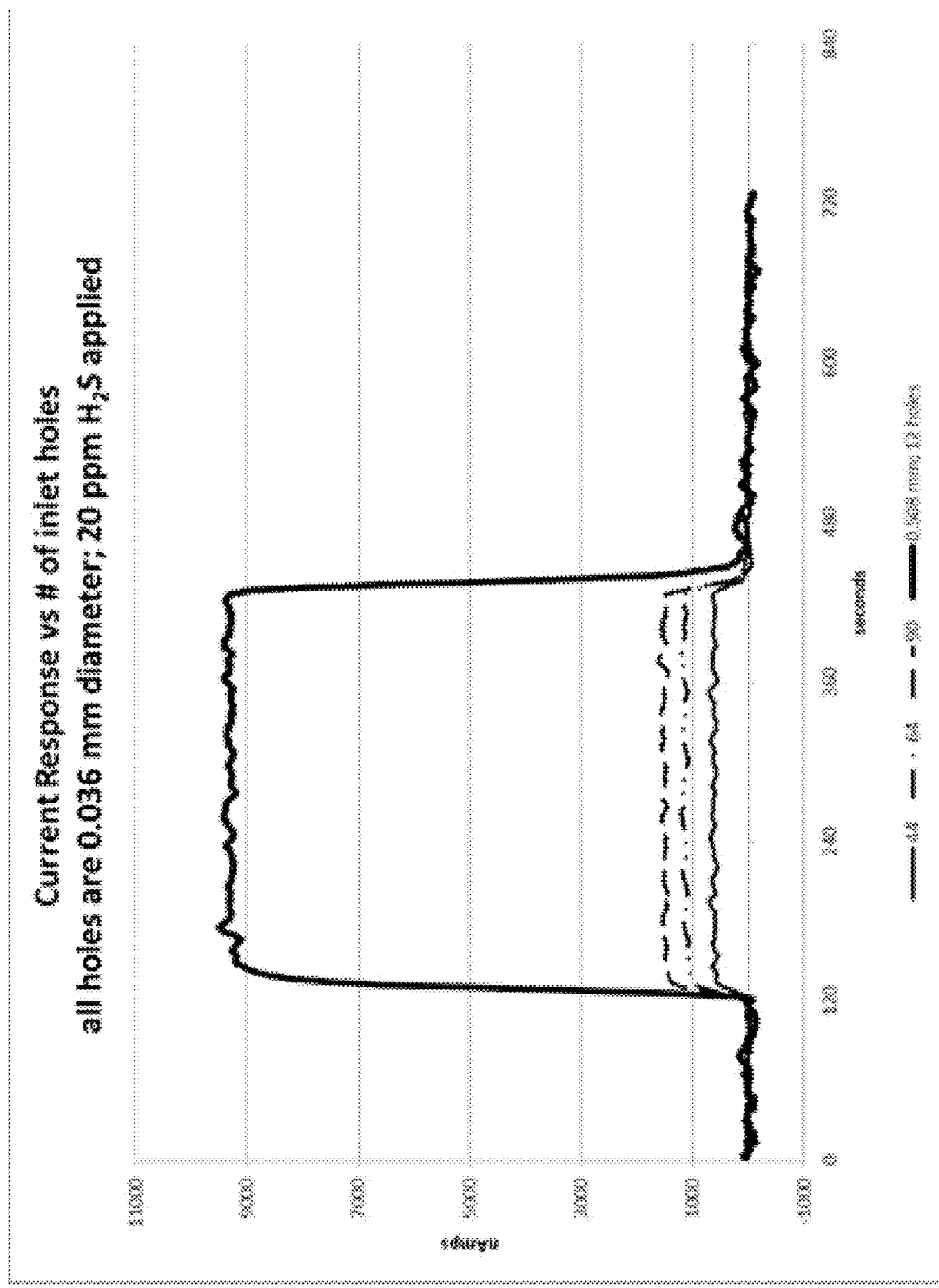
FIG. 11 illustrates average responses to 20 ppm $H_2S$ for sensors including varying numbers of inlet passages (44, 64 and 90) of a diameter of 36 µm and the response of an $H_2S$ sensor including 12 inlet passages, each having a diameter of approximately 0.508 mm.
Figure 12:
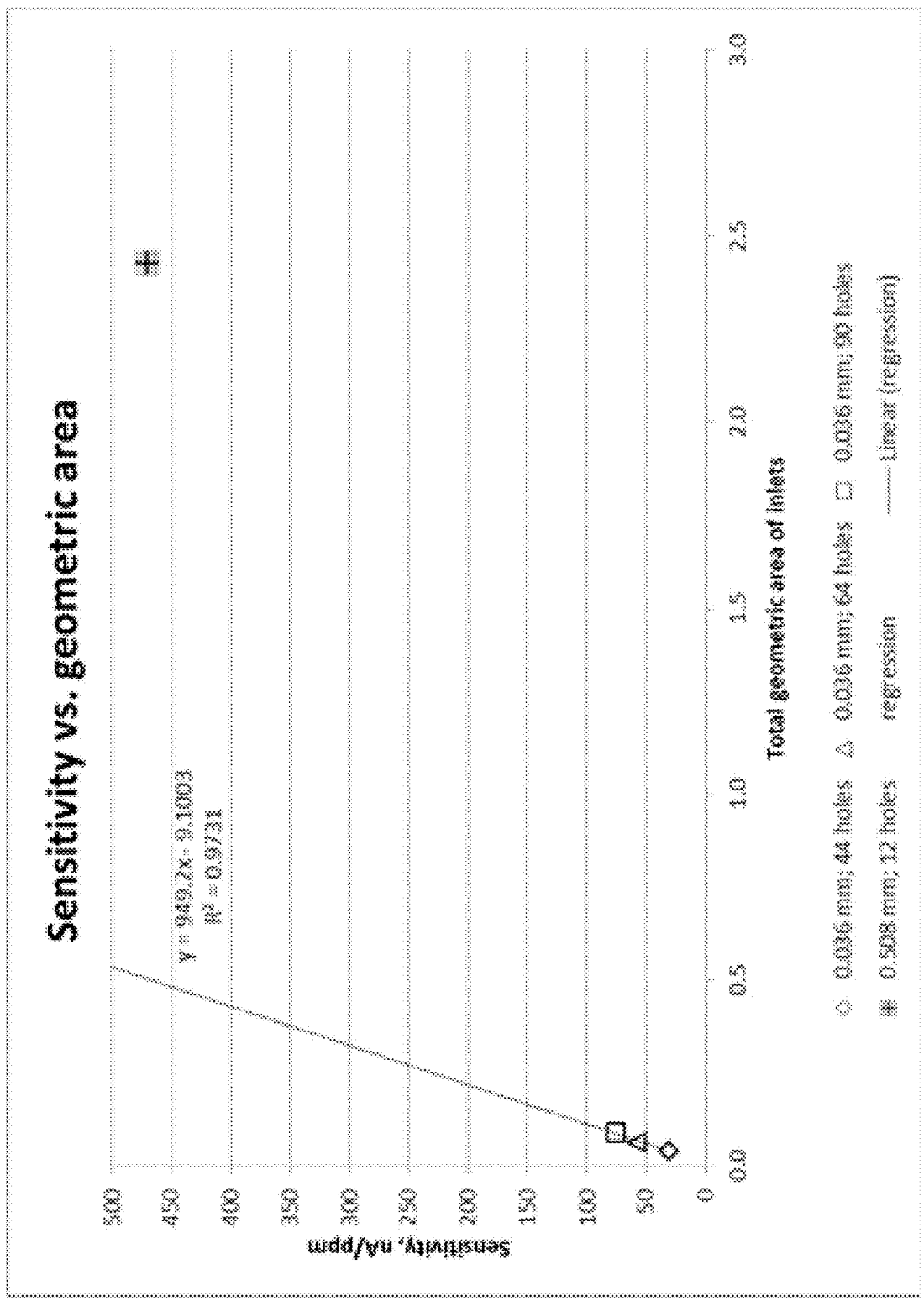
FIG. 12 illustrates a summary of the results for the $H_2S$ sensors of FIG. 11 in which the sensitivity (nA/ppm) is plotted as a function of total geometric area of the inlet passages in mm$^2$

Further studies were conducted for the Ir/Ir/Ir electrode $H_2S$ sensor with larger number of 36 μm diameter inlet passages. To further explore the small or capillary inlets passages, studies were conducted wherein sensor lids were drilled using laser technology to have various number of 36 μm diameter inlet passages (for example, 44, 64 and 90 inlet passages). Laser drilling was used for these studies. However, as set forth above other technologies that can yield reproducible inlet passaged of controlled diameters may be used (mechanical drilling for example). Three sensors of each type (that is, number of inlet passages) were constructed. The average responses to 20 ppm $H_2S$ are shown in FIG. 11. The response of an $H_2S$ sensor including 12 inlet passages, each having a diameter of approximately 0.508 mm, is included in FIG. 11 for comparison. While the sensors with the plurality of 36 μm diameter inlet passages exhibited fast $H_2S$ response, their sensitivities are significantly lower than the $H_2S$ sensor having 12 inlet passages, each having a diameter of approximately 0.508 mm. However, a plot of the sensitivities of the sensors having a plurality of 36 μm diameter inlet passages as a function of total geometric area shows a linear response (see FIG. 12). A regression of the data was used to predict both the total geometric area and the number of 36 μm diameter holes that should yield sensitivities comparable to that of the reference sensor as follows: 0.504 mm$^2$ and 495 holes.

Figure 13:
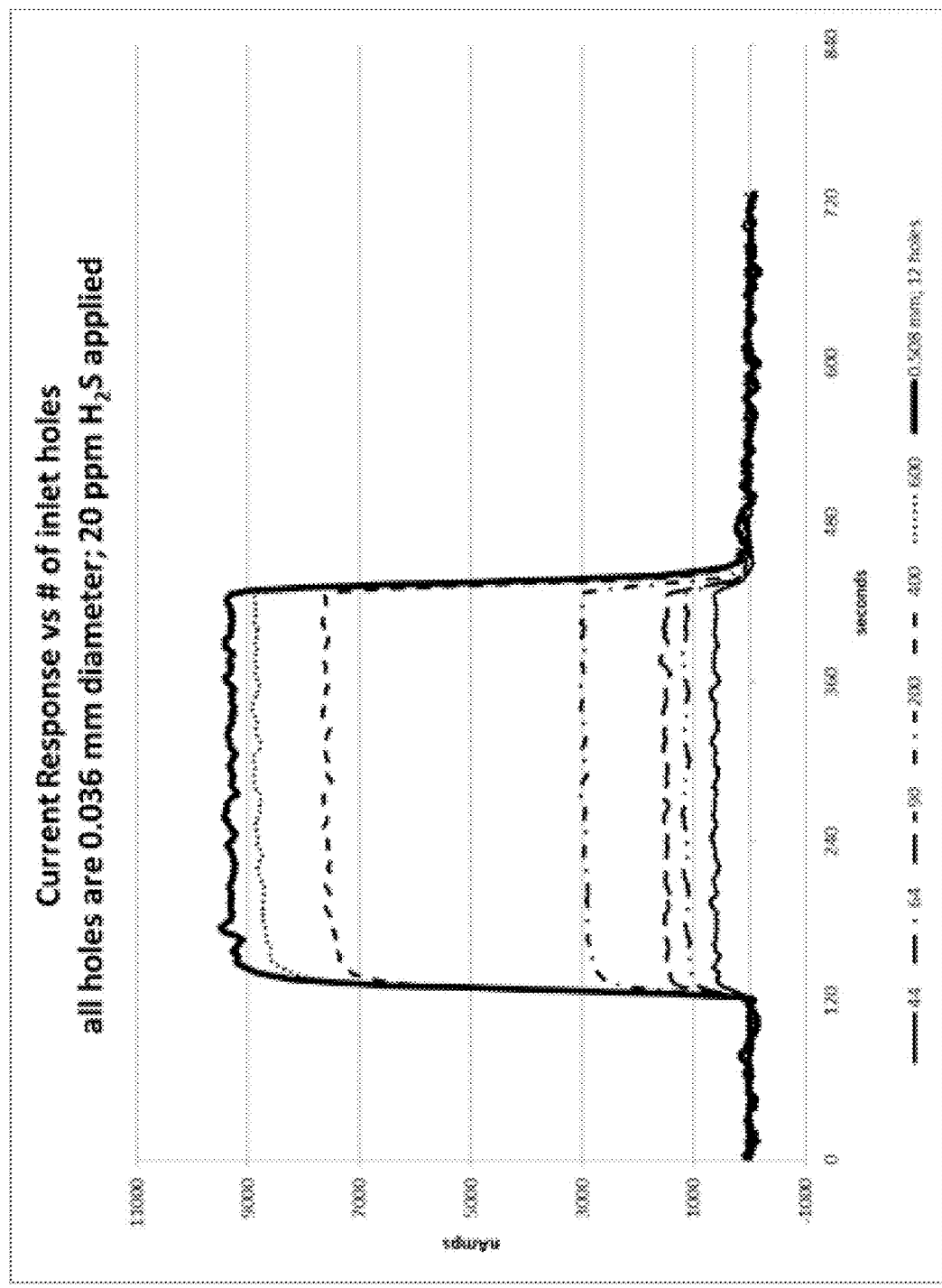
FIG. 13 illustrates average responses to 20 ppm $H_2S$ for sensors including varying numbers inlet passages (44, 64, 90, 200, 400 and 600) of a diameter of 36 µm and the response of an $H_2S$ sensor including 12 inlet passages of a diameter of approximately 0.508 mm
Figure 14:
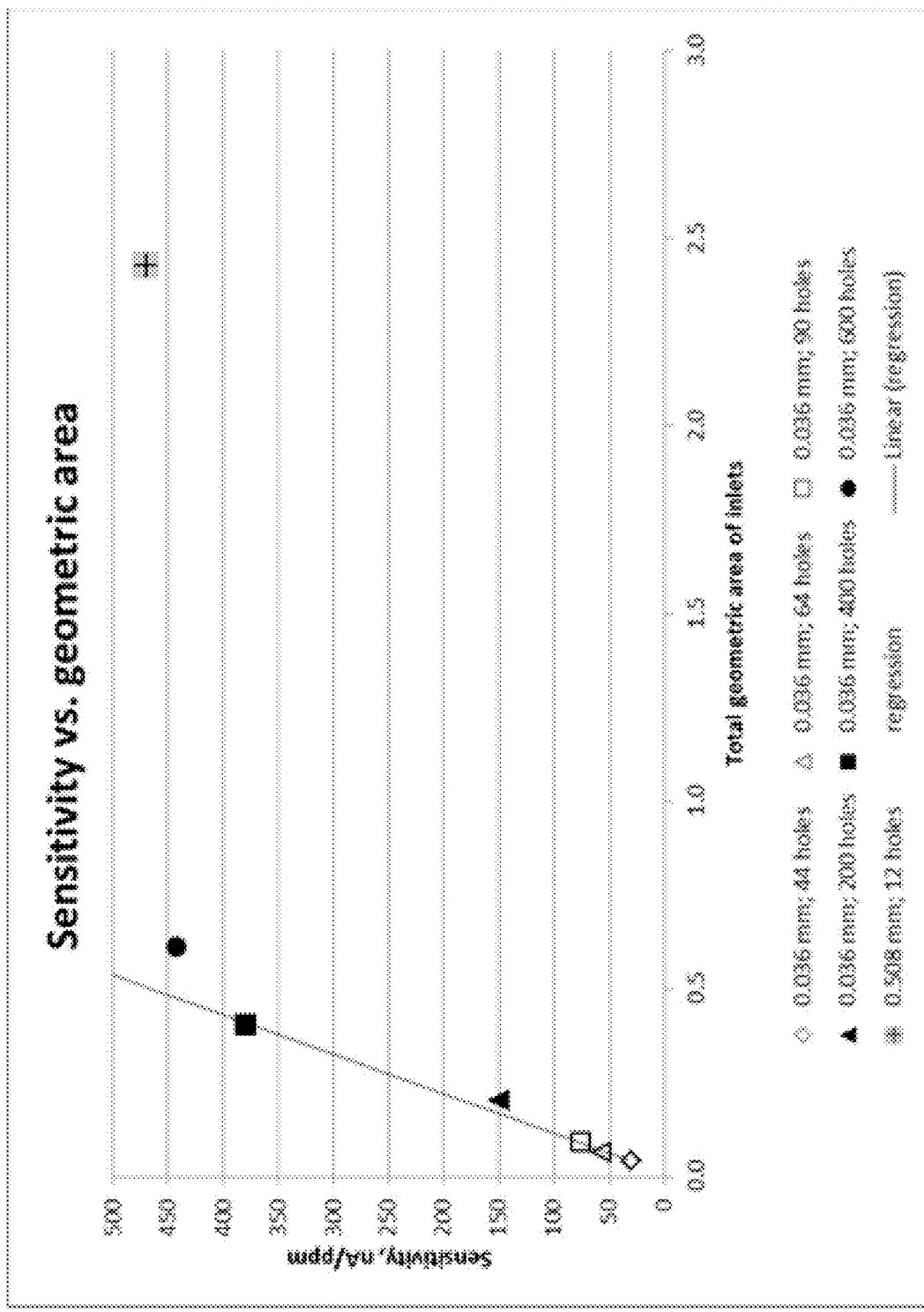
FIG. 14 illustrates a summary of the results for the $H_2S$ sensors of FIG. 13 in which the sensitivity (nA/ppm) is plotted as a function of total geometric area of the inlet passages in mm$^2$.

Additional $H_2S$ sensors were constructed that were identical to the sensors having 36 μm diameter inlet passages described above, except that the number of inlet passages was increased. In that regard, three groups of sensors having three sensors in each group (for a total of nine sensors) and having lids with 200, 400 and 600 inlet passages of 36 μm diameter were investigated. The average current responses of these sensors as well as those from the studies above are shown in FIG. 13. FIG. 14 illustrates a plot of the sensitivities of the sensors of FIG. 14 as a function of the total geometric area. The results with sensors having 200 and 400 inlet passages show good agreement with the results predicted from the regression, while the sensor having 600 inlet passages demonstrated some variance from the regression analysis. Sensors having 400 inlet passages produced sensitivities that are within a range suitable for use in analytical sensors. However, sensors having 600 holes produced sensitivities nearly identical to the reference $H_2S$ sensor described above, while the total geometric area of the 600-inlet passages sensor was 75% smaller than the reference or typical sensor. These studies confirm that it is possible to achieve the same or improved sensitivities as those achieved with conventional electrochemical sensors (which typically include a single inlet passage) in the case of electrochemical sensors hereof which include a plurality of capillary-sized inlet passages or holes. Furthermore, a plurality of capillary-sized inlet passages may be used in any system in which an inlet is provided to allow gas to enter the system to reduce the effect of changes in humidity within the interior of the system.

In a number of studies of the effect of relative humidity (RH) on sensors hereof, two groups of ten $H_2S$ sensors were built which had comparable sensitivities but very different inlet hole total geometric areas. All the sensors were filled with the same volume of electrolyte. The inlet hole designs of the sensor lids are summarized in Table 1 below. While both groups of sensor had similar sensitivities, group 1 achieved this high sensitivity with approximately $\frac{1}{5}^{th}$ of the inlet hole total geometric area of group 2.

| Group No. | # of holes | Total geometric area, mm$^2$ | Single hole diameter, mm | Average H$_2$S Sensitivity, nA/ppm |
|---|---|---|---|---|
| 1 | 600 | 0.611 | 0.036 | 510 ± 28 |
| 2 | 18 | 2.857 | 0.450 | 568 ± 31 |

Figure 15:
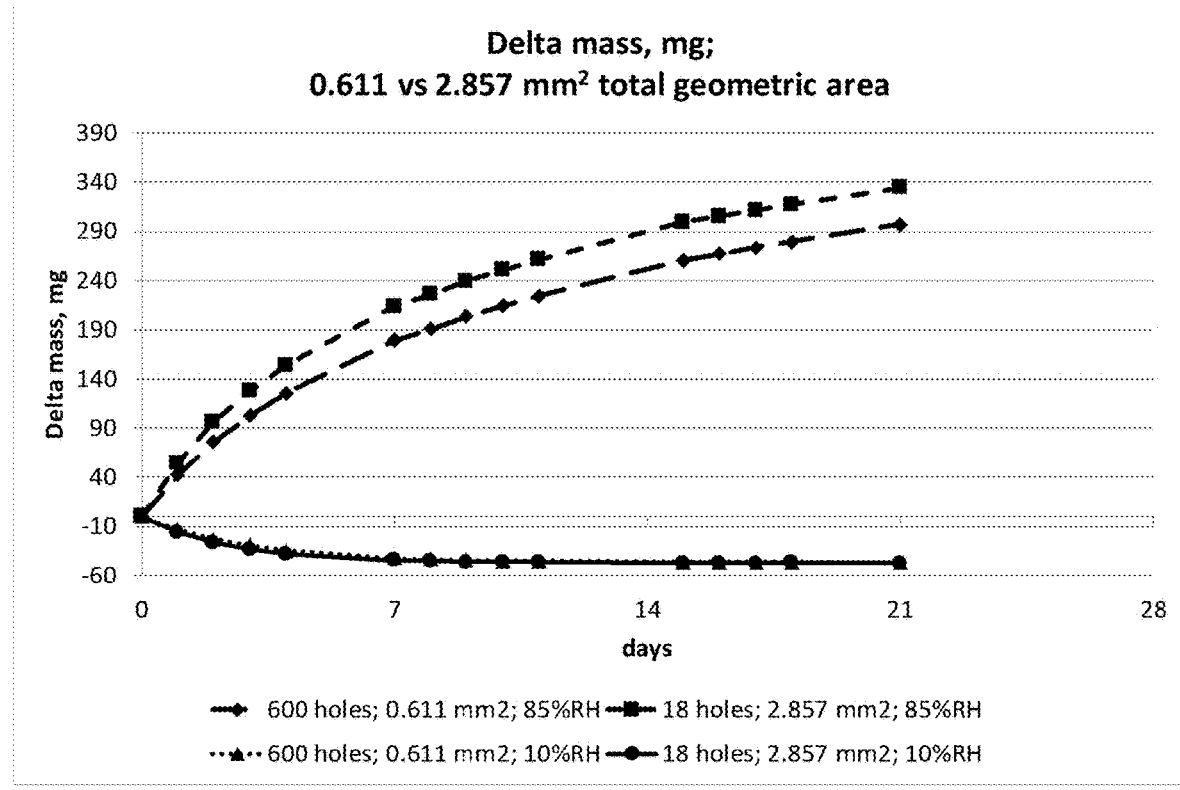
FIG. 15 illustrates a study of the change in mass of two groups of sensor over time at 10% relative humidity and at 85% relative humidity, wherein the first group of sensors includes 600 inlet passages having a total geometric area of 0.611 mm$^2$, and the second group of sensors includes 18 inlet passages having a total geometric area of 2.857 mm$^2$.
Figure 16:
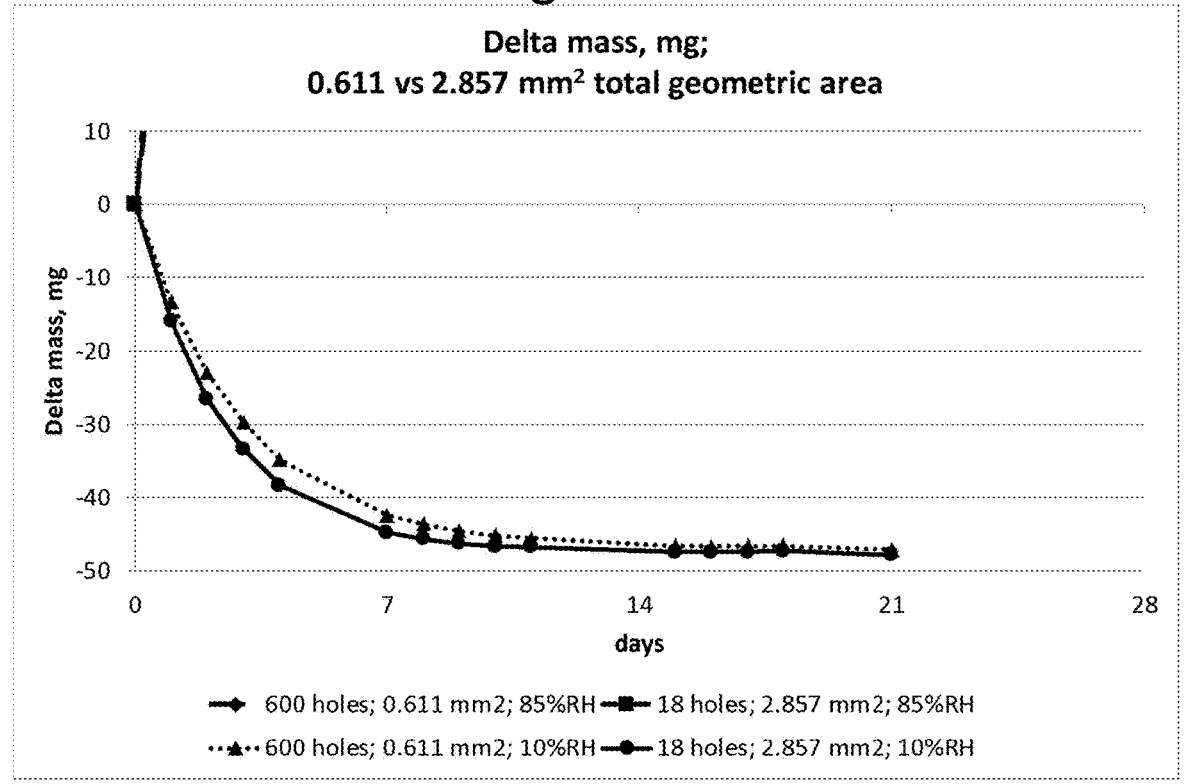
FIG. 16 illustrates the data of FIG. 15 at 10% relative humidity wherein the scale has been expanded.

To evaluate the relative stability of these sensors to changing environmental conditions, half of each group were stored in constant 25° C. 10% RH and the other half of each group were stored in constant 25° C. 85% RH. The sensors were weighed and gas tested over a period of 21 days. The changes in sensor mass in both RH conditions are summarized in FIG. 15. The changes in sensor mass at 10% RH are expanded in FIG. 16.

During 85% RH storage, group 1 (smaller total geometric area) gains water mass at a slower rate than group 2 and never gains as much as group 2 during the 21 day test. Additionally, during 10% RH storage, group 1 loses water at a slower rate than group 2. The rate of water transpiration into and out of the sensors is thus reduced in the group 1 lid design.

Figure 17:
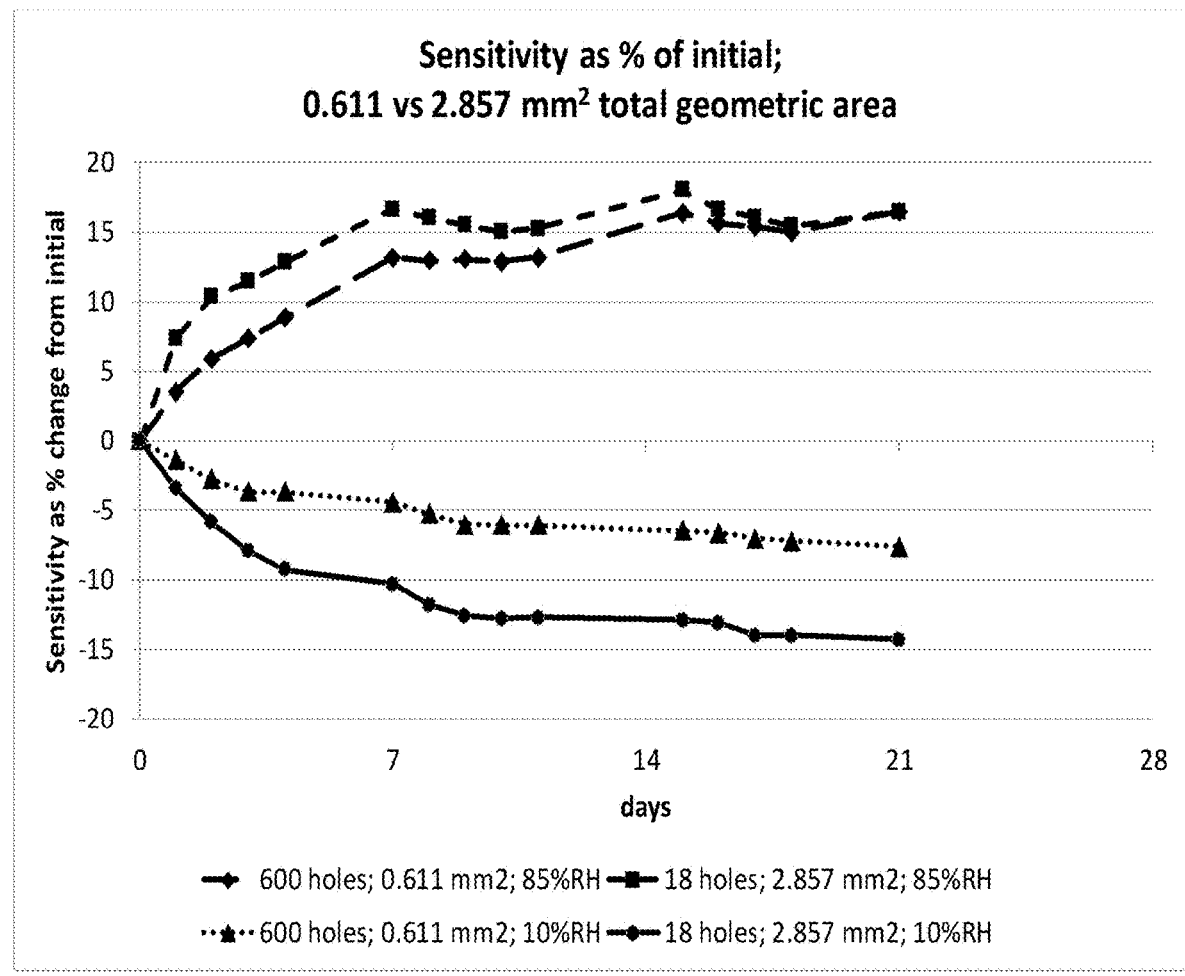
FIG. 17 illustrate a study of the change in sensitivity over time of the two groups of sensors of FIG. 15 at 10% relative humidity and at 85% relative humidity.

The changes in sensitivities of the sensors over the same time period is shown in FIG. 17. The sensitivities are plotted as the % change in sensitivity from the initial, day 0 test. This simulates a calibration of the sensor in an instrument on day 0 and then being exposed to changing environmental conditions.

At 85% RH, the group 1 sensors changed sensitivity at a slower rate that the group 2 sensors. While the sensitivities of the two groups did converge, this did not occur until the 18$^{th}$ day. At 10% RH, the group 1 sensors changed sensitivity at a slower rate and never converged with the group 2 sensors, even after 21 days.

The tests of the effects of RH were intentionally designed to stress the sensor to the extremes of the relative humidity ranges. While extreme RH changes can occur during a sensor's normal use in the field, these RH shifts are not constant for weeks at a time. The sensors slowly respond to seasonal changes in RH over months. The sensors in group 1 would be even more stable than those in group 2 under these conditions.

The studies hereof demonstrate a number of advantage of the devices, systems and methods hereof. For example, sensors with reduced total geometric areas (as compared to conventional, single-inlet-passage sensors) provided by a plurality of inlet passages of small diameter or small cross-sectional area possess very good sensitivities for usable signal to noise ratios while being more stable to changes in environmental conditions. Further, use of a plurality smaller inlet passages rather than a single relatively large inlet passage, assists in protecting the sensor interior from damage from narrow or thin debris which may pass through a relatively large inlet passage. Moreover, existing sensors are readily retrofitted to utilize devices, systems and methods hereof by replacing the lid or other housing structure including the inlet passage(s) with a lid or other housing structure including a plurality of inlet holes as described herein (thereby reducing or limiting the effect of environmental changes such as humidity changes).

The foregoing description and accompanying drawings set forth a number of representative embodiments at the present time. Various modifications, additions and alternative designs will, of course, become apparent to those skilled in the art in light of the foregoing teachings without departing from the scope hereof, which is indicated by the following claims rather than by the foregoing description. All changes and variations that fall within the meaning and range of equivalency of the claims are to be embraced within their scope.

What is claimed is:

1. An electrochemical gas sensor, comprising:
    a sensor housing comprising a plurality of inlet passages, each of the plurality of inlet passages having a cross-sectional area of no greater than 11,309 $\mu m^2$, and wherein a cumulative geometric area of the plurality of inlet passages is in the range of 0.25 mm$^2$ to 2.25 mm$^2$;
    a gas diffusion membrane inside the sensor housing;
    a working electrode within the sensor housing, which is responsive to an analyte gas, the gas diffusion membrane being positioned between the plurality of inlet passages and the working electrode so that gas passing through the plurality of inlet passages transports through the gas diffusion membrane to the working electrode; and
    an electrolyte within the sensor housing in ionic contact with the working electrode.

2. The electrochemical sensor of claim 1 wherein each of the plurality of inlet passages has a cross-sectional area of no greater than 2827 $\mu m^2$.

3. The electrochemical sensor of claim 1 wherein each of the plurality of inlet passages has a cross-sectional area of no greater than 1257 $\mu m^2$.

4. The electrochemical sensor of claim 3 wherein the electrochemical sensor detects concentration changes of the analyte gas on the order of 5000 ppm or less.

5. The electrochemical sensor of claim 3 wherein the electrochemical sensor detects concentration changes of the analyte gas on the order of 1000 ppm or less.

6. The electrochemical sensor of claim 3 wherein the electrochemical sensor detects concentration changes of the analyte gas on the order of 100 ppm or less.

7. The electrochemical sensor of claim 3 wherein the electrochemical sensor detects changes in concentration of an analyte gas other than oxygen.

8. The electrochemical sensor of claim 3 wherein the electrolyte is hygroscopic.

9. The electrochemical sensor of claim 3 wherein the electrolyte comprises an aqueous acidic solution.

10. The electrochemical sensor of claim 1 wherein each of the plurality of inlet passages has a cross-sectional area of no greater than 787 $\mu m^2$.

11. The electrochemical gas sensor of claim 1 wherein the working electrode comprises a layer of catalyst deposited on a side of the diffusion membrane opposite a side thereof facing the plurality of inlets.

12. A method of detecting an analyte gas comprising: providing an electrochemical gas sensor, comprising a sensor housing comprising a plurality of inlet passages, each of the plurality of inlet passages having a cross-sectional area of no greater than 11,309 $\mu m^2$, and wherein a cumulative geometric area of the plurality of inlet passages is in the range of 0.25 mm$^2$ to 2.25 mm$^2$, a gas diffusion membrane inside the sensor housing; a working electrode within the sensor housing which is responsive to the analyte gas, the gas diffusion membrane being positioned between the plurality of inlet passages and the working electrode so that gas passing through the plurality of inlet passages transports through the gas diffusion membrane to the working electrode; and an electrolyte within the sensor housing in ionic contact with the working electrode.

13. The method of claim 12 wherein each of the plurality of inlet passages has a cross-sectional area of no greater than 2827 $\mu m^2$.

14. The method of claim 12 wherein each of the plurality of inlet passages has a cross-sectional area of no greater than 1257 $\mu m^2$.

15. The method of claim 14 wherein the electrochemical sensor detects concentration changes of the analyte gas on the order of 5000 ppm or less.

16. The method of claim 14 wherein the electrochemical sensor detects concentration changes of the analyte gas on the order of 1000 ppm or less.

17. The method of claim 14 wherein the electrochemical sensor detects concentration changes of the analyte gas on the order of 100 ppm or less.

18. The method of claim 14 wherein the electrochemical sensor detects changes in concentration of an analyte gas other than oxygen.

19. The method of claim 14 wherein the electrolyte is hygroscopic.

20. The method of claim 14 wherein the electrolyte comprises an aqueous acidic solution.

21. The method of claim 12 wherein each of the plurality of inlet passages has a cross-sectional area of no greater than 787 $\mu m^2$.

22. The method, of claim 12 wherein the working electrode comprises a layer of catalyst deposited on a side of the diffusion membrane opposite a side thereof facing the plurality of inlets.

23. A method of fabricating an electrochemical gas sensor, comprising: providing a sensor housing comprising a plurality of inlet passages, each of the plurality of inlet passages having a cross-sectional area of no greater than 11,309 $\mu m^2$, and wherein a cumulative geometric area of the plurality of inlet passages is in the range of 0.25 $mm^2$ to 2.25 $mm^2$, providing a gas diffusion membrane inside the sensor housing; providing a working electrode within the sensor housing which is responsive to an analyte gas, the gas diffusion membrane being positioned between the plurality of inlet passages and the working electrode so that gas passing through the plurality of inlet passages transports through the gas diffusion membrane to the working electrode; and providing an electrolyte within the sensor housing in ionic contact with the working electrode.

* * * * *

UNITED STATES PATENT AND TRADEMARK OFFICE
CERTIFICATE OF CORRECTION

PATENT NO. : 10,948,449 B2  
APPLICATION NO. : 15/685432  
DATED : March 16, 2021  
INVENTOR(S) : Brian Keith Davis, Michael Alvin Brown and Mark Flori Zanella, Sr.

Page 1 of 1

Figure 5B:
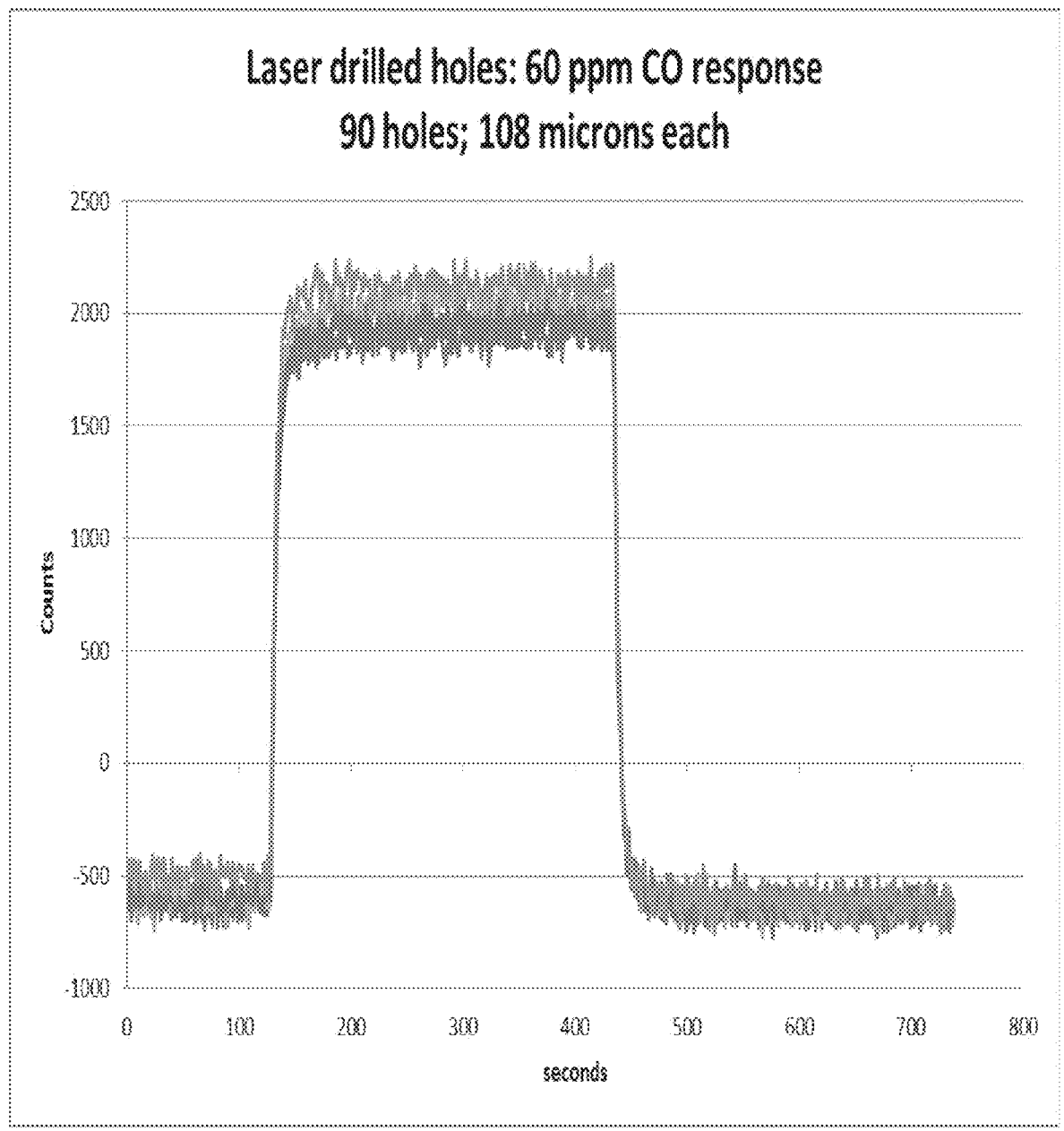
FIG. 5B illustrates responses of sensors including 90 inlet passages or holes of a diameter of 108 µm to 60 ppm of CO.

It is certified that error appears in the above-identified patent and that said Letters Patent is hereby corrected as shown below:

In the Specification
Column 5, Line 45, delete "the user the presence" and insert --alert the use of the presence--.
Column 8, Line 13, delete "Electronic circuitry 190" and insert --Electronic circuitry 190a--.
Column 9, Line 24, delete "FIG. 4C" and insert --FIG. 5B--.
Column 10, Line 47, delete "FIG. 14" and insert --FIG. 13--.

Signed and Sealed this
Twenty-second Day of June, 2021

Drew Hirshfeld
*Performing the Functions and Duties of the*
*Under Secretary of Commerce for Intellectual Property and*
*Director of the United States Patent and Trademark Office*